United States Patent
Murgan et al.

(10) Patent No.: US 9,226,235 B2
(45) Date of Patent: Dec. 29, 2015

(54) CIRCUIT ARRANGEMENT AND A METHOD FOR COMMUNICATION NETWORK SEARCH AND SIGNAL POWER MEASUREMENT

(75) Inventors: Tudor Murgan, Munich (DE); Jean-Xavier Canonici, Cannes (FR); Sanjeev Tavathia, Breinigsville, PA (US)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 296 days.

(21) Appl. No.: 13/584,860

(22) Filed: Aug. 14, 2012

(65) Prior Publication Data

US 2014/0051435 A1 Feb. 20, 2014

(51) Int. Cl.
*H04W 88/06* (2009.01)
*H04W 52/02* (2009.01)

(52) U.S. Cl.
CPC ............ *H04W 52/0216* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 7,444,166 | B2 * | 10/2008 | Sahota | 455/553.1 |
| 2002/0054624 | A1 * | 5/2002 | Boloorian | 375/150 |
| 2003/0186713 | A1 * | 10/2003 | Sugaya et al. | 455/501 |
| 2003/0236098 | A1 * | 12/2003 | Hayoun | 455/500 |
| 2008/0125118 | A1 * | 5/2008 | Ormson | 455/434 |
| 2012/0275321 | A1 * | 11/2012 | Ruvalcaba et al. | 370/252 |
| 2013/0329816 | A1 * | 12/2013 | Zukunft et al. | 375/259 |

\* cited by examiner

*Primary Examiner* — Quan M Hua

(57) ABSTRACT

A circuit arrangement is provided. The circuit arrangement may include: a processing circuit configured to receive a pre-processed signal at a first data rate during a first time period, the processing circuit further configured to perform a communications network search by processing the pre-processed signal at a first processing clock frequency during the first time period, and to perform the communications network search by processing the pre-processed signal at a second processing clock frequency during a second time period, wherein the second time period commences after the first time period, and wherein the second processing clock frequency is greater than the first processing clock frequency.

21 Claims, 15 Drawing Sheets

1100

1102 — Receive communications signal

1104 — Process communications signal

1106 — Provide pre-processed signal at first data rate during first time period

1004 — Process pre-processed signal at first processing clock frequency during first time period 1108 — Provide pre-processed signal at second data rate during second time period 1006 — Process pre-processed signal at second processing clock frequency during second time period

FIG. 11

CIRCUIT ARRANGEMENT AND A METHOD FOR COMMUNICATION NETWORK SEARCH AND SIGNAL POWER MEASUREMENT

TECHNICAL FIELD

Various aspects of this disclosure relate to a circuit arrangement and a method for communication network search and signal power measurement.

BACKGROUND

Performing network search and/or signal measurements, e.g. performing signal power measurements, for example by processing downlink (DL) signals from a base station, may be challenging. Some reasons for this may be, for example, limited time available to a mobile terminal for performing signal processing, e.g. on the DL signals from the base stations; power consumption constraints; required speed and reactivity in latching onto another network or new cells. Further, in order to receive, for example, DL signals from the base stations, the RF (radio frequency) front end of the mobile terminal may be required to remain switched on at the time digital signal processing on the signal is done. This may imply both increased power consumption and a delay in performing network search and measurements because of the limit on the rate at which real time samples are received and processed in the mobile terminal Accordingly, it may be desirable to have a mobile terminal with improved network detection and power measurement rate, faster network detection and power measurement speed, reduced power consumption, increased network search and power measurement capacity, and a reduced rate or number of call drops.

SUMMARY

A circuit arrangement is provided. The circuit arrangement may include: a processing circuit configured to receive a pre-processed signal at a first data rate during a first time period, the processing circuit further configured to perform a communications network search by processing the pre-processed signal at a first processing clock frequency during the first time period, and to perform the communications network search by processing the pre-processed signal at a second processing clock frequency during a second time period, wherein the second time period commences after the first time period, and wherein the second processing clock frequency is greater than the first processing clock frequency.

A method for communication network search and signal power measurement is provided. The method may include: receiving a pre-processed signal at a first data rate during a first time period; processing the pre-processed signal at a first processing clock frequency during the first time period, and processing the pre-processed signal at a second processing clock frequency during a second time period, wherein the second time period commences after the first time period, and wherein the second processing clock frequency is greater than the first processing clock frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 11 shows a method for communication network search and signal power measurement.

DESCRIPTION

The following detailed description refers to the accompanying drawings that show, by way of illustration, specific details and aspects in which this disclosure may be practiced. These aspects of the disclosure are described in sufficient detail to enable those skilled in the art to practice the disclosure. Other aspects of this disclosure may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects of this disclosure.

Figure 1:
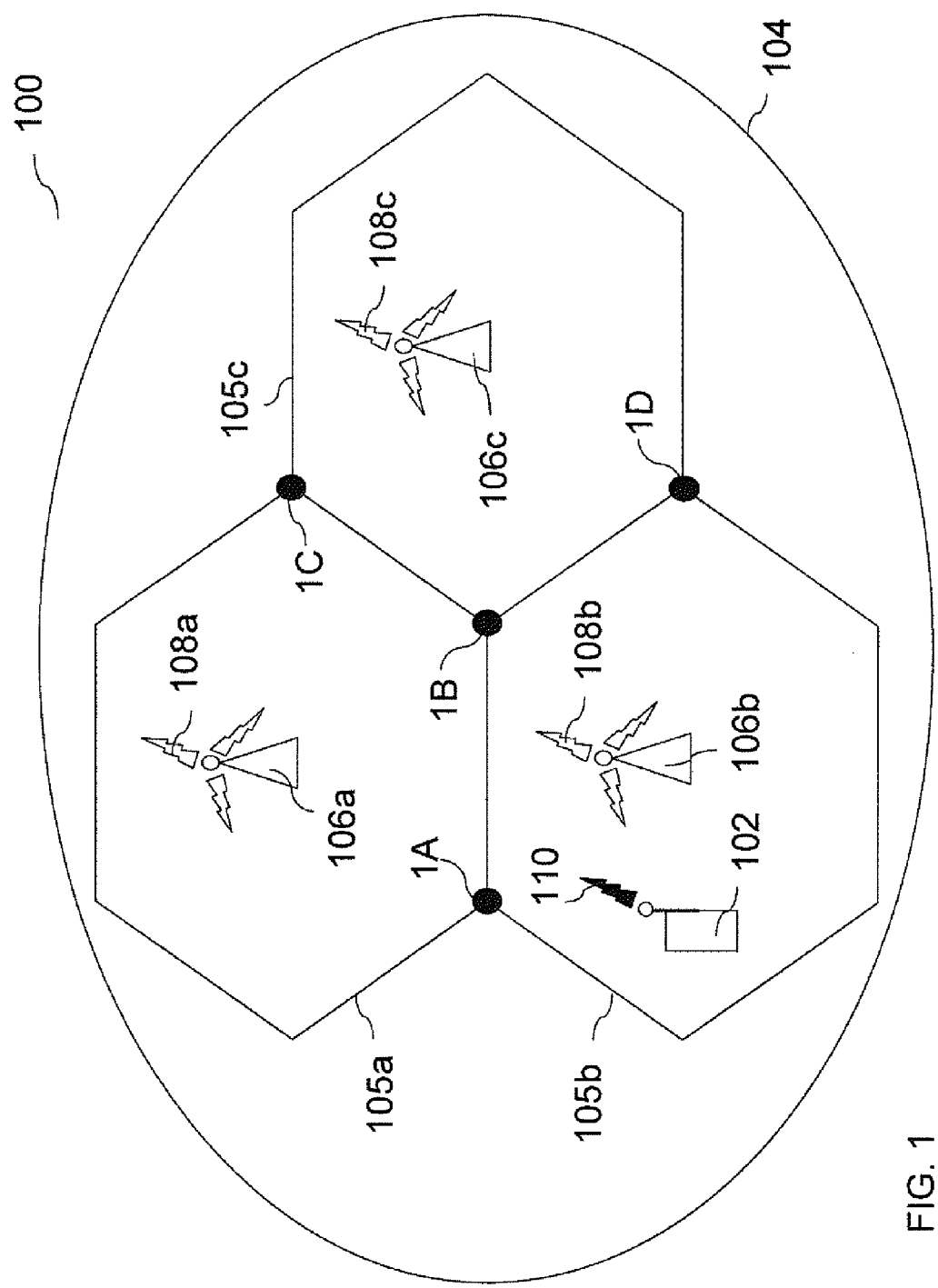
FIG. 1 shows a communications system.

FIG. 1 shows a communications system 100.

The communications system 100 may be configured in accordance with the network architecture of any one of, or any combination of, a LTE (Long Term Evolution) cellular communications system, WLAN (wireless local area network), WiFi, UMTS (Universal Mobile Telecommunications System), GSM (Global System for Mobile Communications), Bluetooth, CDMA (Code Division Multiple Access) cellular communications system, etc.

A mobile terminal 102, such as, for example, a UE (user equipment) equipped with a SIM (Subscriber Identity Module) running on a UICC (Universal Integrated Circuit Card), may be within the area of coverage of a first network 104, such as, for example, a PLMN (Public Land Mobile Network). The area of coverage of the first network 104 may be the aggregate result of the coverage of at least one base station belonging to the first network 104, such as, for example, one, two, three, four, five, six, seven, eight, nine, ten or even more base stations belonging to the first network 104, such as tens or hundreds of base stations belonging to the first network 104.

By way of an example, the area of coverage of the first network 104 in FIG. 1 may at least be the aggregate result of the coverage of base stations 106a, 106b, and 106c and others belonging to the first network 104 (other base stations not shown in FIG. 1).

In FIG. 1, each base station 106a, 106b, and 106c may be configured to transmit a downlink (DL) signal at a particular power to cover a particular geographical area. By way of an example, base station 106a may be configured to transmit DL signal 108a; base station 106b may be configured to transmit DL signal 108b; and base station 106c may be configured to transmit DL signal 108c. The geographical area covered by a particular base station 106a, 106b, or 106c may be substantially (namely, approximately) represented by a cell. By way of an example, the area of coverage of base station 106a may be substantially represented by cell 105a; the area of coverage of base station 106b may be substantially represented by cell 105b; and the area of coverage of base station 106c may be substantially represented by cell 105c. Accordingly, the area of coverage of the first network 104 may be the result of at least one cell, or the result of a tessellation of a plurality of cells, wherein each cell is an approximation of the area of coverage of a particular base station. By way of an example, area of coverage of the first network 104 may be the result of the tessellation of cells 105a, 105b, and 105c, wherein each cell is an approximation of the area of coverage of base stations 106a, 106b, and 106c, respectively.

Each cell 105a, 105b, and 105c may be an approximation of the area of coverage of a particular base station 106a, 106b, 106c. Nonetheless, there may be geographical regions that may be served by more than one base station. By way of an example, the geographical region on either side of the boundary formed between points 1A and 1B of FIG. 1 may be served by at least one of base stations 106a and 106b; the geographical region on either side of the boundary formed between points 1B and 1C of may be served by at least one of base stations 106a and 106c; and the geographical region on either side of the boundary formed between points 1B and 1D of may be served by at least one of base stations 106b and 106c.

The mobile terminal 102 located within the area of coverage of the first network 104 may be initially switched off, namely, powered down. Alternatively, the mobile terminal 102 located within the area of coverage of the first network 104 may already be switched on, namely, powered up.

When the mobile terminal 102 is initially switched off, there may be no connection between the mobile terminal 102 and any one of the base stations 106a, 106b, and 106c within the area of coverage of the first network 104. Accordingly, a mobile terminal 102 that is switched off may not have connectivity to any communications service delivered by the first network 104. However, when the mobile terminal 102 is turned on within the area of coverage of the first network 104, the mobile terminal 102 may be required to search for and identify a base station belonging to the first network 104 in order to establish an initial communications connection with the first network 104. By way of an example, mobile terminal 102 may be required to search for and identify any one of, or any combination of 106a, 106b, and 106c in order to be connected to the first network 104. By way of an example, the mobile terminal may search for and identify one of, or any combination of 106a, 106b, and 106c by receiving and processing the DL signals 108a, 108b, and 108c of the base stations 106a, 106b, and 106c.

Additionally, the mobile terminal 102 may be required to measure the power of the DL signals 108a, 108b, and 108c of the base stations 106a, 106b, and 106c in order to establish a new connection (or to maintain an existing connection) with the first network 104. By way of an example, the mobile terminal 102 may be required to measure the power of any one of, or any combination of, DL signals 108a, 108b, and 108c.

Since the area of coverage of each base station may be represented as a cell, searching for and identifying a base station may be considered as searching for and identifying a cell to latch onto. As used herein, latching onto a cell may refer to the mobile terminal 102 establishing at least one communications channel with the base station serving the cell. By way of an example, the mobile terminal 102 may latch onto base station 106b in order to establish at least one communications channel (such as, for example, a channel for an uplink (UL) signal 110 and a channel for a DL signal 108b) in the first network 104.

Accordingly, performing network search and/or identification, for example, cell search and/or cell identification, may be a critical task that establishes or maintains a connection between the mobile terminal 102 and a communications network, such as, for example, the first network 104 including base stations 106a, 106b, and 106c.

It is reiterated that the first network 104 may be configured in accordance with the network architecture of any one of, or any combination of, a LTE cellular communications system, WLAN, WiFi, UMTS, GSM, Bluetooth, CDMA cellular communications system, etc. By way of an example, the first network 104 may be configured in accordance with a UMTS cellular system, wherein each of the UL signal 110 and the DL signal 108a, 108b, 108c may include at least one frame, wherein each frame includes a plurality of slots. In this example, a mobile terminal 102 that is initially switched on may search for and identify a cell to latch onto by performing at least one of the following: synchronizing slot and frame boundaries between the mobile terminal 102 and the base station serving the cell the mobile terminal 102 is located in; identifying the code group and scrambling code of the base station (and hence, the code group and scrambling code of the cell served by the base station); and acquiring the frequency or frequencies of the base station (and hence, the frequency or frequencies of the cell served by the base station). Consequently, the mobile terminal 102 that is initially powered up in FIG. 1 may identify cell 105b served by base station 106b.

By way of an example, the mobile terminal 102 may already be switched on, namely, powered up in the first network 104. When the mobile terminal 102 is already powered up in the first network 104, the mobile terminal 102 may be stationary or mobile.

When the mobile terminal 102 is already powered up and stationary, the mobile terminal 102 may be required to perform network search and/or signal measurement whilst being connected to the first network 104. By way of an example, a mobile terminal 102 that is already connected or attached to the first network 104 may have periods of activity and periods of inactivity. Periods of activity may be characterized by data being actively exchanged between the mobile terminal 102 and the base station that the mobile terminal 102 has latched onto, such as, for example, base station 106b in FIG. 1. Data may be exchanged between the mobile terminal 102 and the base station 106b through DL signals 108b and UL signals 110.

Periods of inactivity (namely, idle periods) may be characterized by the absence of data exchange between the mobile terminal 102 and the base station 106b, even though the mobile terminal 102 may still be attached to the first network 104. When a mobile terminal 102 is already powered up, it may be put in an Idle mode until data is exchanged with the base station 106b via the UL 110 and DL 108b signals. As used herein "Idle mode" may refer to the mobile terminal 102 not having at least one dedicated communications channel allocated to it during the time it is within the area of coverage of a communications network, such as, for example, the first network 104.

However, when data are available for exchange between the base station 106b and the mobile terminal 102, the mobile terminal 102 may be switched from the Idle mode to a Connected mode. As used herein "Connected mode" may refer to the mobile terminal 102 having at least one dedicated communications channel allocated to it during the time it is within the area of coverage of a communications network, such as, for example, the first network 104.

If the mobile terminal 102 is inactive for a period of time, such as, for example, a few seconds (one, two, three, four, five, six, seven, eight, nine, ten or even more seconds, such as tens or hundreds of seconds), the mobile terminal 102 may once again be switched from the Connected mode to Idle mode in order to save network resources.

Switching from the Idle mode to the Connected mode (and vice versa) may be required to perform continual network search (such as, for example, PLMN cell search) and signal measurement (such as, for example DPE (Delay Power estimation) in order to maintain a connection with the first network 104. The Connected mode may include various service states, such as, for example, Cell_DCH (Cell Dedicated Transport Channel), Cell_FACH (Cell Forward Access Channel), Cell_PCH (Cell Paging Channel), URA_PCH (UTRAN Registration Area Paging Channel), E_FACH (Enhanced Forward Access Channel), E_PCH (Enhanced Paging Channel), etc.

In some cases, the mobile terminal 102 may maintain continuous connectivity with the first network 104 even during period of inactivity. Stated differently, the mobile terminal 102 may continually be in the Connected mode and not switch to an Idle mode even during idle periods when no data are exchanged between the mobile terminal 102 and the base station 106b. This may be required in certain types of communications services that require continuous connectivity, fast response times, and low latency, such as, for example, IM (Instant Messaging). By way of an example, a first network 104 configured in accordance with a UMTS cellular system may implement continuous connectivity between the mobile terminal 102 and the first network 104 through CPC (Continuous Packet Connectivity), CPC-DRX (Continuous Packet Connectivity—Discontinuous Reception), etc.

In some cases, the mobile terminal 102 may perform network search and signal power measurements on neighboring networks, e.g. neighboring cells, whilst continually exchanging data with its current serving network, e.g. a currently serving cell. By way of an example, mobile terminal 102 may perform network search and/or signal power measurements on neighboring cells 105a and 105c, whilst exchanging data with its current serving cell 105b. This may be accomplished by placing gaps in the UL 110 and DL 108b signals that may allow the mobile terminal 102 to perform network searches and/or signal power measurements whilst on a call (namely, whilst exchanging data with its current serving cell). An example of this may be the Compressed Mode utilized in UMTS. By way of an example, the neighboring cells 105a and 105c may have the same frequency as, or have a different frequency from, its current serving cell 105b. Accordingly, each of cells 105a, 105b, and 105c may be configured according to any one of GSM, E-UTRAN, LTE, WLAN, WiFi, UMTS, CDMA, etc.

When the mobile terminal 102 is already powered up and mobile, the mobile terminal 102 may be required to perform network search and/or measurement whilst crossing cells within the first network 104.

Figure 2:
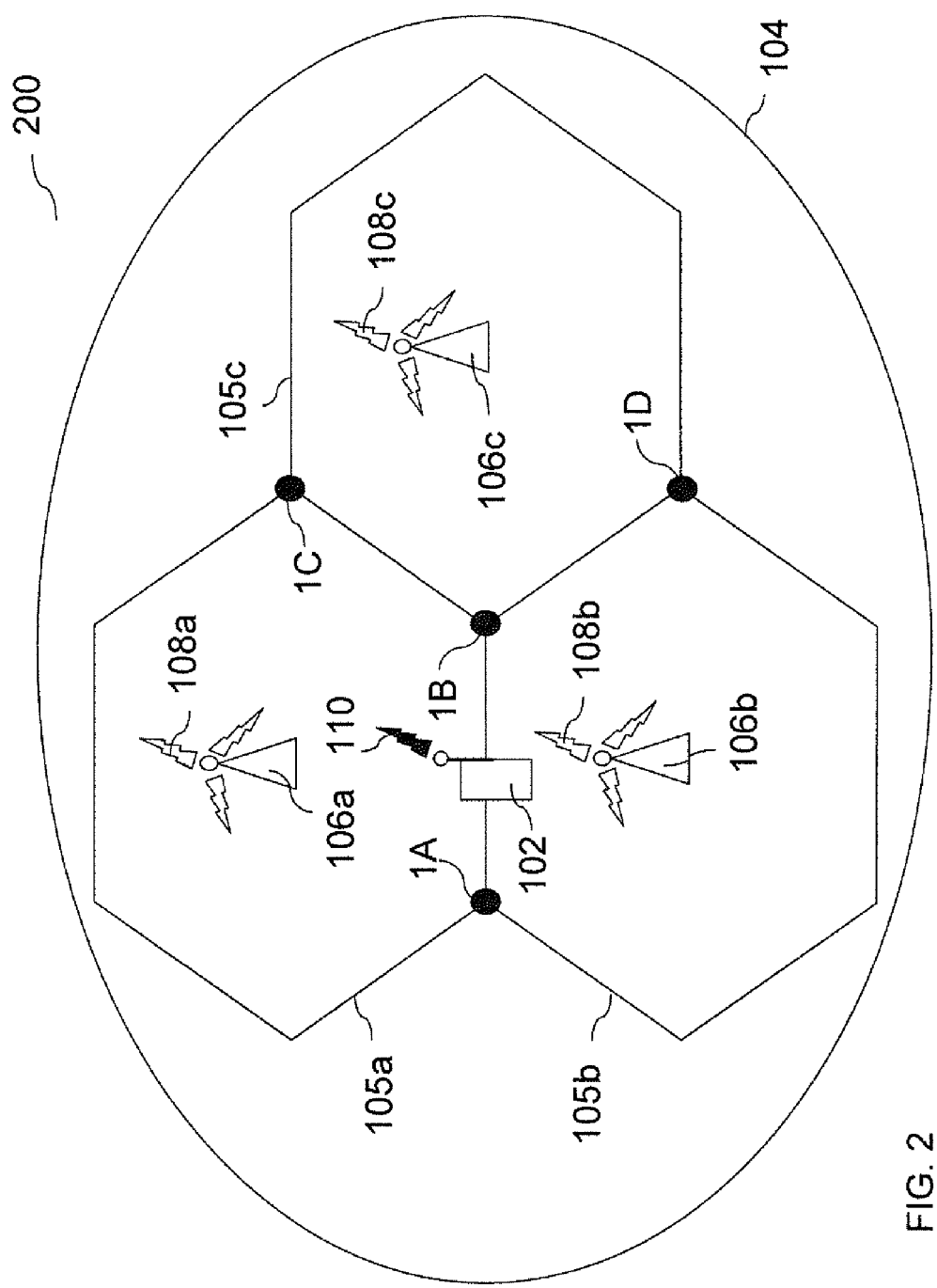
FIG. 2 shows a communications system including a mobile terminal crossing from one cell to another cell within a first network.

FIG. 2 shows a communications system 200 including a mobile terminal 102 crossing from one cell to another cell within the first network 104. By way of an example, when the mobile terminal 102 crosses from one cell to another, such as, for example, from cell 105b to cell 105a in FIG. 2, the mobile terminal 102 may be required to search for and identify a new base station to latch onto. By way of an example, the mobile terminal 102 may search for and identify cell 105a served by base station 106a by receiving and processing the DL signal 108a of base station 106a whilst it moves from cell 105b to cell 105a. Additionally, the mobile terminal 102 may measure the power of the DL signal 108a of the base station 106a in order to establish a new connection or to maintain an existing connection with the first network 104 through the base station 106a of cell 105a.

The above-mentioned case wherein the mobile terminal 102 may be required to search for and identify a new base station to latch onto whilst in motion may also be applicable to a stationary mobile terminal 102 that is located in a geographical proximity to a boundary formed between two cells, such as, for example, around the boundary formed by points 1A and 1B of FIG. 2. As mentioned above, each cell may be configured in accordance with any one of GSM, E-UTRAN, LTE, WLAN, WiFi, UMTS, CDMA, etc. Accordingly, IRAT (Inter-Radio Access Technologies) may be applicable to a mobile terminal 102 required to search for and identify a new base station to latch onto whilst in motion.

The above-mentioned case wherein the mobile terminal 102 may be required to search for and identify a new base station to latch onto may also be applicable when a mobile terminal 102 crosses from a first network 104 to another network.

Figure 3:
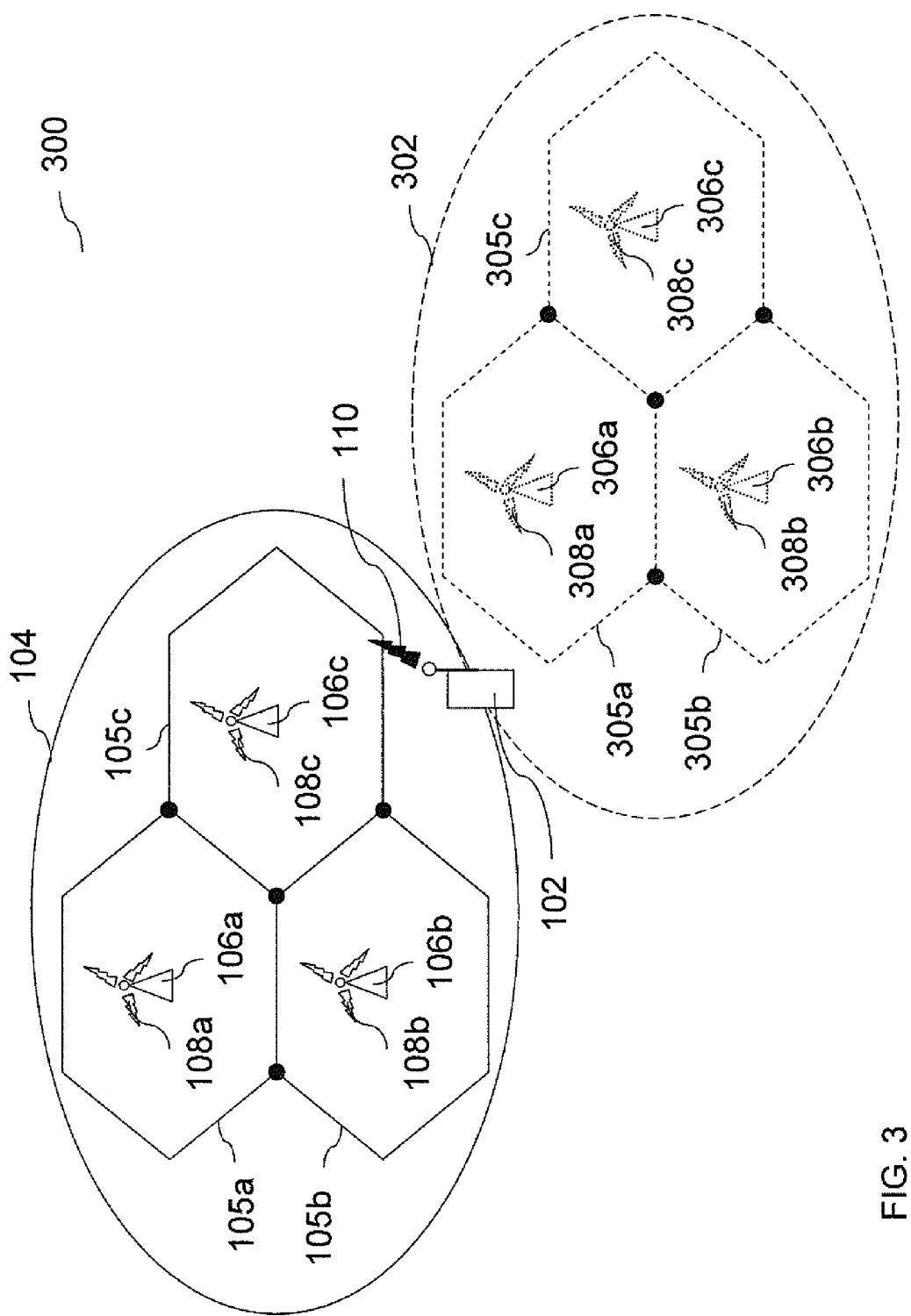
FIG. 3 shows a communications system including a mobile terminal crossing from a first network to a second network.

FIG. 3 shows a communications system 300 including a mobile terminal 102 crossing from a first network 104 to a second network 302. Each cell 305a, 305b or 305c of the second network 302 may be configured in accordance with any one of GSM, E-UTRAN, LTE, WLAN, WiFi, UMTS, CDMA, etc. Accordingly, the mobile terminal 102 may be required to search for and identify a new base station to latch onto in order to handover a call from one cellular network to another.

Accordingly, network search and/or identification, along with signal power measurements, may be required in at least the following scenarios: as the mobile terminal 102 remains within the geographical region covered by a first network (such as in FIGS. 1 and 2), or as the mobile terminal 102 moves from one network standard to another (such as in FIG. 2 and FIG. 3).

Network search and/or identification, along with signal power measurements, may be performed by processing any one of, or any combination of, the DL signals 108a, 108b, 108c, 308a, 308b, 308c. Since each cell 105a, 105b, 105c, 305a, 305b, 305c may be configured in accordance with any one of GSM, E-UTRAN, LTE, WLAN, WiFi, UMTS, CDMA, etc., the structure of the DL signals 108a, 108b, 108c, 308a, 308b, 308c may depend on the cellular or communications configuration of the cell.

Performing network search and/or identification and/or measurements (such as performing signal power measurements) by processing DL signals from a base station may be challenging. Some reasons for this may be: limited time available for performing signal processing on the DL signals from the base stations (such as, for example, limited time to perform PLMN cell searches or cell re-selection in scenarios like IRAT, Compressed Mode, etc.); power consumption constraints (such as, for example, in CPC DRX, Idle periods, etc.); required speed and reactivity in latching onto new cells (such as, for example, when crossing cells, in handovers, IRAT, etc.). Further, in order to receive DL signals from the base stations, the RF (radio frequency) front end of the mobile terminal may be required to remain switched on at the time digital signal processing on the DL signal is done. This may imply both increased power consumption (in both RF and digital baseband signal processing) and a delay in performing network search and/or identification and/or signal measurements because of the limit on the rate at which real time samples are received and processed in the mobile terminal. Whilst FIG. 1 to FIG. 3 may illustrate cellular systems, similar observations may be made in other network and/or mobility scenarios that may require network search and/or signal measurements, e.g. inter-RAT monitoring, RAT selection, RAT reselection, and traffic offloading.

A circuit arrangement may be provided that may increase the speed at which network search, along with signal power measurement, are performed by the mobile terminal. Consequently, the circuit arrangement may reduce RF power consumption in a mobile terminal, thus increasing battery life of the mobile terminal. The circuit arrangement may improve performance of network search and/or identification, along with improving signal power measurements, in particularly challenging mobile scenarios, such as, for example, in a fast-fading environment, or when the mobile terminal is moving at high speeds. Performance of network search and/or identification may be characterized by any one of, or any combination of, cell detection and power measurement rate, cell detection and power measurement speed, reduced baseband power consumption, increased network search and power measurement capacity, and a reduction in the rate or number of call drops.

The word "circuit" is used herein to mean any kind of a logic implementing entity, which may be special purpose circuitry or processor executing software stored in a memory, firmware, or any combination thereof. Thus, in one or more examples, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

Figure 4:
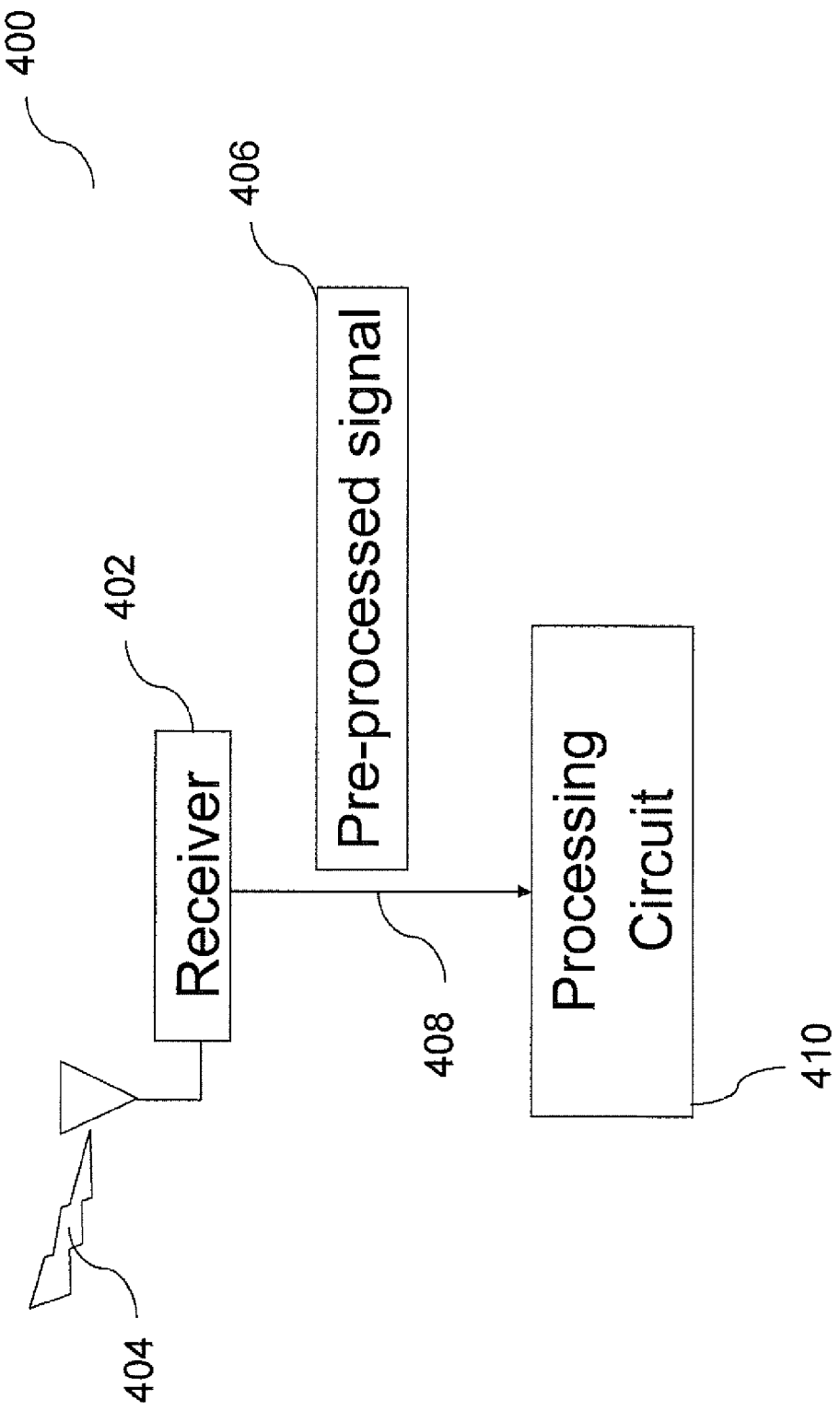
FIG. 4 shows a message flow within a circuit arrangement during a first time period.

FIG. 4 shows a message flow within a circuit arrangement 400 during a first time period.

The circuit arrangement 400 may include a receiver 402 configured to receive a communications signal 404.

The circuit arrangement 400 may include a processing circuit 410 configured to receive a pre-processed signal 406 at a first data rate during the first time period.

The message flow (in 408) may occur between the receiver 402 and the processing circuit 410.

Various aspects relating to each of the communications signal 404, the receiver 402, the pre-processed signal 406, the first data rate, the first time period, the processing circuit 410 and the message flow (in 408) are described below.

By way of an example, the communications signal 404 may be any network signal, e.g. a Bluetooth signal, a signal from a NFC (Near Field Communication) device, or a DL signal from a base station. By way of an example, the communications signal 404 may be the DL signal 108a from base station 106a; or the communications signal 404 may be the DL signal 108b from base station 106b; or the communications signal 404 may be the DL signal 108c from base station 106c; or the communications signal 404 may be the DL signal 308a from base station 306a; or the communications signal 404 may be the DL signal 308b from base station 306b; or the communications signal 404 may be the DL signal 308c from base station 306c.

The communications signal 404 may have a structure corresponding to the cellular standard or cellular scheme of a base station. By way of an example, the communications signal 404 may be a DL signal which may be arranged according to a frame structure for a UMTS cellular network. Consequently, the particular structure of the communications signal 404 may vary according to the cellular or network system such as, for example, LTE cellular communications system, WLAN, WiFi, UMTS, GSM, Bluetooth, CDMA cellular communications system, etc.

The receiver 402 may be configured to receive the communications signal 404. Additionally, the receiver 402 may be further configured to receive multiple communications signals 404 simultaneously, such as, for example, DL signals from more than one base station or a plurality of network signals from other networks. By way of an example, the receiver 402 may be configured to receive a plurality of communications signals 404 simultaneously, each communication signal 404 being transmitted on a different frequency. Accordingly, the receiver 402 may include circuitry configured to receive a communications signal 404 at the RF frequency over which the communications signal 404 may be transmitted. Accordingly, the receiver 402 may be included in the RF front-end of a mobile terminal 102. Consequently, the receiver 402 may be arranged in a mobile terminal 102. In like manner, the processing circuit 410 may also be arranged in the mobile terminal 102.

Additionally, the receiver 402 may be configured to receive at least one of a synchronization channel signal and a common pilot channel signal as the communications signal 404. As described above, the synchronization channel signal and the common pilot channel signal may be utilized for subsequent communications network search and/or identification and/or communications signal power measurement.

The receiver 402 of the circuit arrangement 400 may be further configured to process the communications signal 404 to yield a pre-processed signal 406. By way of an example, the receiver 402, which may be included in the RF front-end of a mobile terminal 102, may be configured to perform at least one of the following on the received communications signal 404: filtering, decoding, demodulation, and quantization. Accordingly, the receiver 402 may include at least one of a decoder, a filter, a demodulator, and a quantizer. Accordingly, the pre-processed signal 406 may be the baseband signal corresponding to communications signal 404. The pre-processed signal 406 may include the in-phase and quadrature phase signals of the baseband signal corresponding to communications signal 404. Additionally, the receiver 402 may be configured to measure certain characteristics of the communications signal 404. By way of an example, the receiver 402 may include a measuring circuit to measure the signal strength of the communications signal 404. Accordingly, the pre-processed signal may include a RSSI (Received Signal Strength Indicator) of the received communications signal 404.

The processing of the communications signal 404 to the pre-processed signal 406 may occur whilst the receiver 402 continues to receive other samples of the communications signal 404.

The receiver 402 may be configured to provide (in 408) the pre-processed signal 406 to a processing circuit 410 at a first data rate during the first time period.

The first time period may be a duration of time required to receive a sufficient number of chips or bits or bytes needed to perform or begin to perform network search and/or identification, or for signal power measurement. By way of an example, the first time period in a UMTS system may be in the range of at least one UMTS slot, for example, about 14 UMTS slots to about 16 UMTS slots, such as, for example, 13.50 UMTS slots or 15.57 UMTS slots when the mobile terminal 102 is in an idle mode. The first time period in a GSM system may be in the range of at least one GSM slot, for example, about 16 GSM slots to about 19 GSM slots, such as, for example, 18.00 GSM slots when the mobile terminal is in an idle mode. The first time period in a UMTS system may be in the range of at least one UMTS slot, for example, about 6 UMTS slots to about 8 UMTS slots, such as, for example, 7.50 UMTS slots or 7.00 UMTS slots when the mobile terminal is in a connected mode. Accordingly, the first time period may vary according to the cellular system such as, for example, LTE cellular communications system, WLAN, WiFi, UMTS, GSM, Bluetooth, CDMA cellular communications system, etc.

The first data rate may be the rate at which samples of the pre-processed signal 406, such as, for example, the baseband signal of communications signal 404, are provided by the receiver 402 to the processing circuit 410. The first data rate may be limited by network standards of the cellular technology utilized. By way of an example, in a UMTS cellular system, the receiver 402 may be configured to provide the pre-processed signal 406 to the processing circuit 410 at a rate of 3.84 MChips/s. By way of other examples, the first data rate may be in the range of about 9.6 kbps to about 14.4 kbps in GSM CSD, the first data rate may be in the range of about 56.0 kbps to about 114.0 kbps in GPRS, the first data rate may be in the range of about 150 kbps to about 300 kbps in EDGE, or the first data rate may be any value more than 100 kbps in any 3G network. The aforementioned data rates are illustrative and are not meant to be limiting. In essence, the first data rate may vary according to the network system such as, for example, LTE cellular communications system, WLAN, WiFi, UMTS, GSM, Bluetooth, CDMA cellular communications system, etc.

The processing circuit 410 may be configured to receive the pre-processed signal 407 at the first data rate during the first time period.

The processing circuit 410 may be configured to perform a communications network search by processing the pre-processed signal 406 during the first time period.

The processing circuit 410 may be configured to commence performing communications network search by processing the pre-processed signal 406 during the first time period. By way of an example, in a cellular communications system, the processing circuit 410 may be configured to perform communications network search by determining at least one of the following: slot synchronization, frame synchronization, code group identification and scrambling code identification. In one or more examples where more than one of slot synchronization, frame synchronization, code group identification and scrambling code identification is performed, the processing circuit 410 may be configured to perform these in parallel, or in any sequence. Further, the processing circuit 410 may be configured to begin performing at least one of slot synchronization, frame synchronization, code group identification and scrambling code identification using samples of pre-processed signal 406 as soon as a sample of pre-processed signal 406 is provided by receiver 402 to the processing circuit 410 at the first data rate. Alternatively, the processing circuit 410 may be configured to begin performing at least one of slot synchronization, frame synchronization, code group identification and scrambling code identification using samples of pre-processed signal 406 after a pre-determined number of samples of the pre-processed signal 406 are provided by receiver 402 to the processing circuit 410 at the first data rate, such as, for example, after 6 UMTS slots of data, or after 5 GSM slots of data, etc.

The processing circuit 410 may be configured to process the pre-processed signal 406 at a first processing clock frequency during the first time period.

The first processing clock frequency may refer to the rate at which each sample of the pre-processed signal 406 is processed by the processing circuit 410 during the first time period. The first processing clock frequency may be determined by the logical clock signal provided to the processing circuit 410 during the first time period.

The first processing clock frequency may be at least substantially (namely, approximately) the first data rate. Alternatively, the first processing clock frequency may be different from the first data rate. By way of an example, the receiver 402 may be configured to provide pre-processed signals 406 to the processing circuit 410 at a rate of about 3.84 MChips/s in a UMTS system. Accordingly, the first data rate may be about 3.84 MChips/s in a UMTS system. In the case that the processing circuit 410 is running with a processor of clock frequency 61 MHz, the first processing clock frequency may consequently be 61 MHz (as opposed to the first data rate of about 3.84 MChips/s). In the case that the processing circuit 410 is running with a processor of clock frequency 58 MHz, the first processing clock frequency may consequently be 58 MHz (as opposed to the first data rate of about 3.84 MChips/s). In the case that the processing circuit 410 is running with a processor of clock frequency about 3.84 MHz, the first processing clock frequency may consequently be about 3.84 MHz (and thus substantially the first data rate of about 3.84 MChips/s). It may also be possible that the first data rate is higher than the first processing clock frequency. The aforementioned first processing clock frequencies are illustrative and are not meant to be limiting. In essence, the first processing clock frequency that may be the same as the first data rate, or may be different from the first data rate.

In light of the above description, the processing circuit 410 may, therefore, be configured to perform communications network search by processing the pre-processed signal 406 at a first processing clock frequency during the first time period.

Further, the processing circuit 410 may be configured to perform communications signal 404 power measurement by processing the pre-processed signal 406 at the first processing clock frequency during the first time period. Since the pre-processed signal 406 is being processed at the first processing clock frequency for both communications network search and communications signal power measurement in the first time period, the processing circuit 410 may be configured to perform communications signal power measurement and communications network search in parallel during the first time period. Alternatively, communications signal power measurement may be performed in any sequence with communications network search.

Figure 5:
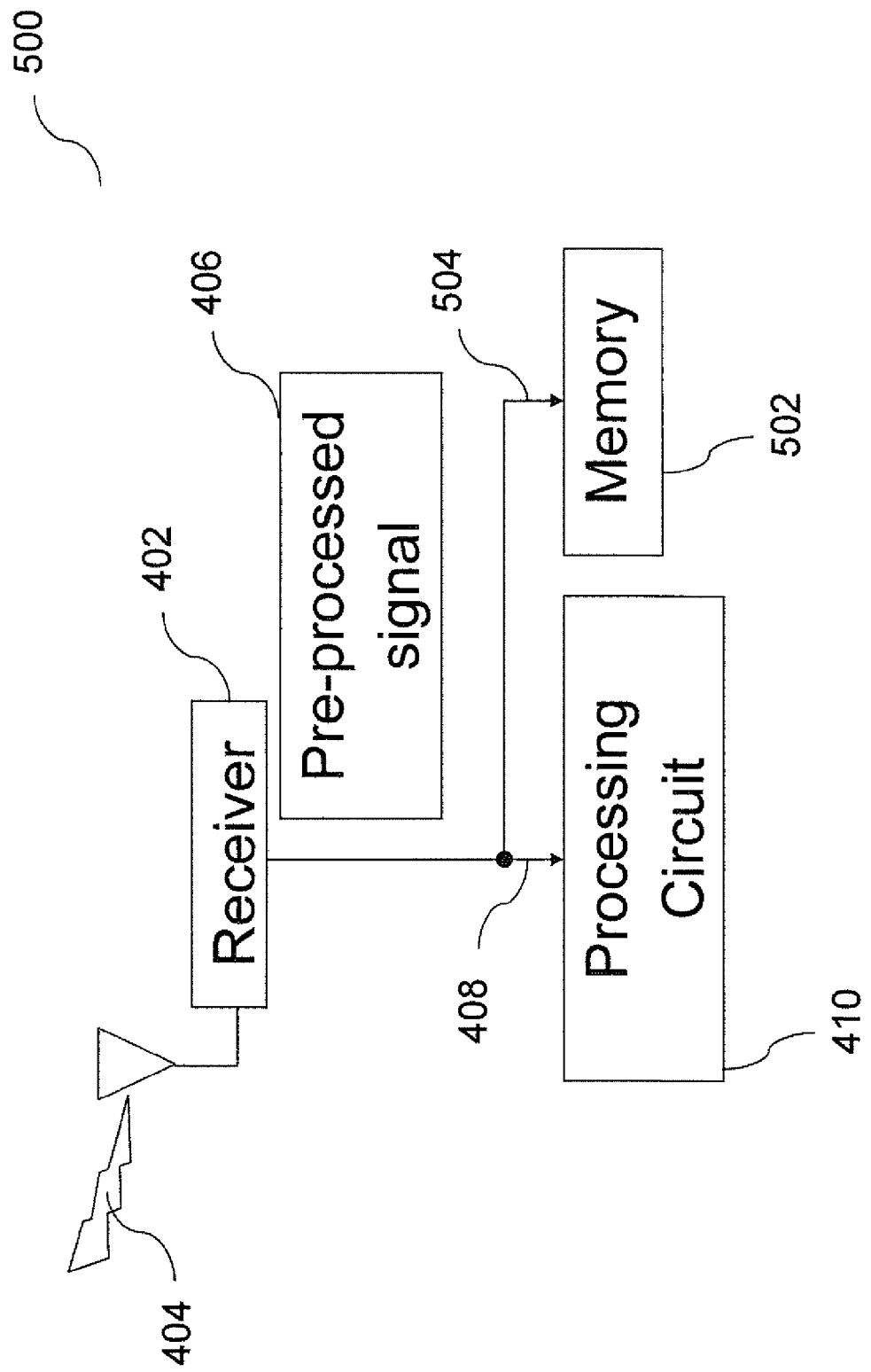
FIG. 5 shows another message flow within a circuit arrangement during a first time period.

FIG. 5 shows a message flow within a circuit arrangement 500 during a first time period.

The circuit arrangement 500 may include a receiver 402, a processing circuit 410, and a memory 504.

The message flow may occur between the receiver 402 and the processing circuit 410 (in 408), and between the receiver 402 and the memory 502 (in 504).

The circuit arrangement 500 may further include a memory 502, such as, for example, RAM (random access memory) or flash memory, etc. The memory 502 may be configured to store the pre-processed signal 406 during the first time period. Although the memory 502 is shown to be separate from the processing circuit 410 in FIG. 5, the memory 702 may, alternatively or additionally, be part of the processing circuit 410 and the receiver 402. The memory 502 may be configured to store (in 504) the pre-processed signal 406 during the above-described first time period.

The memory 502 may be further configured to store the pre-processed signal 406 at the first data rate during the first time period. Accordingly, the receiver 402 may be further configured to provide the pre-processed signal 406 to the memory 502 at the first data rate during the first time period. Accordingly, there may not be a need for either one of the memory 502 or the receiver 402 to buffer the pre-processed signal 406 for subsequent storage (in 504) in the memory 502 during the first time period. In addition, the receiver 402 may be configured to provide the pre-processed signal 406 to the memory 502 during the first time period in an interrupted manner. By way of an example, the receiver 402 may provide a first group of pre-processed signals 406 to the memory 502 for a first part of the first time period. This may be followed by a second part within the first time period in which the memory 502 may not receive (and hence, may not store) any pre-processed signal 406. This may then be followed by a third part within the first time period in which the receiver 402 may provide a second group of pre-processed signals 406 to the memory. By way of an example, the second group of pre-processed signals may be used to replace at least a portion of the first group of pre-processed signals stored in the memory 504. Alternatively, the second group of pre-processed signals may be stored in the memory 504 in addition to the first group of pre-processed signals.

Figure 6:
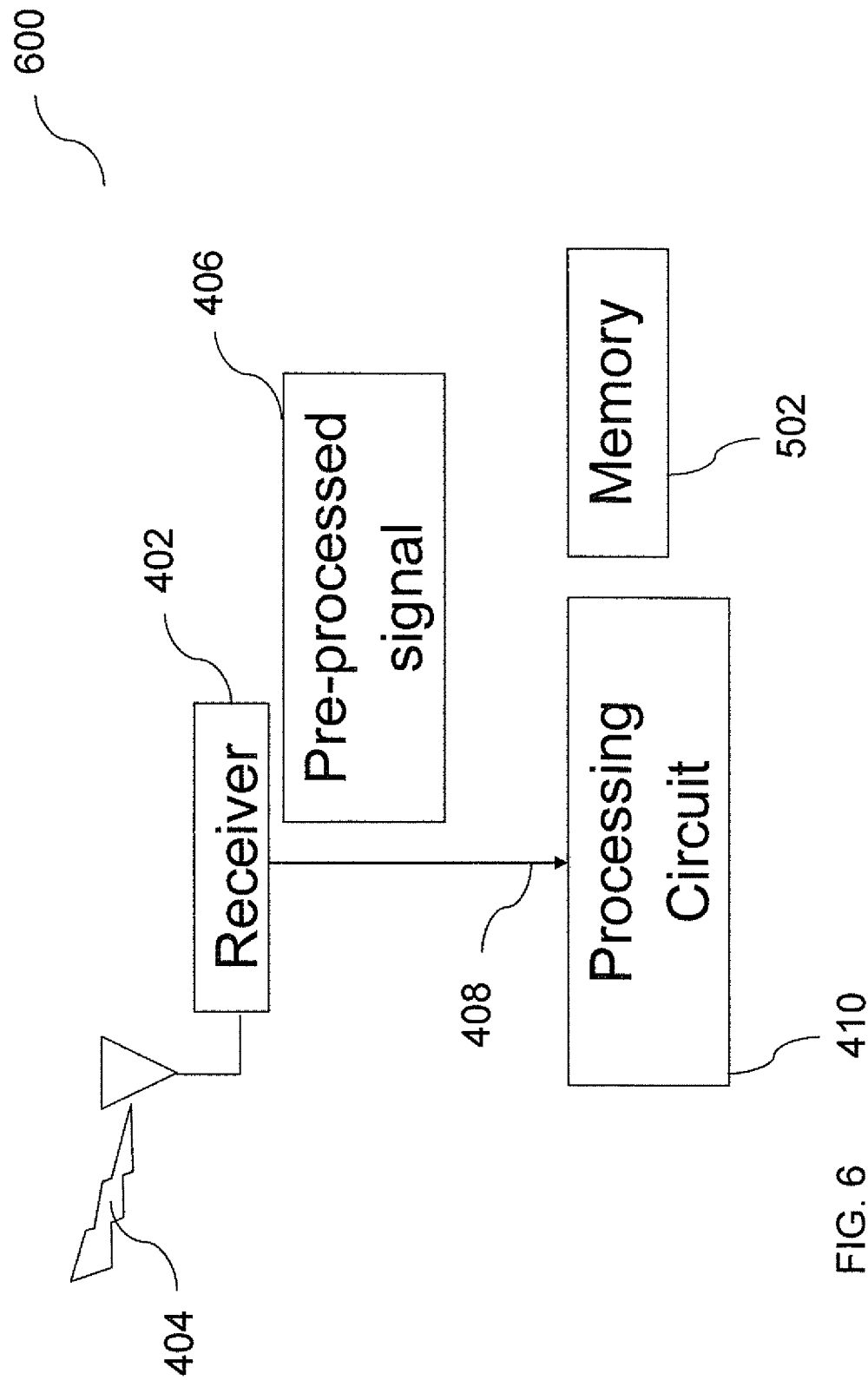
FIG. 6 shows a message flow within a circuit arrangement during a first time period.
Figure 7:
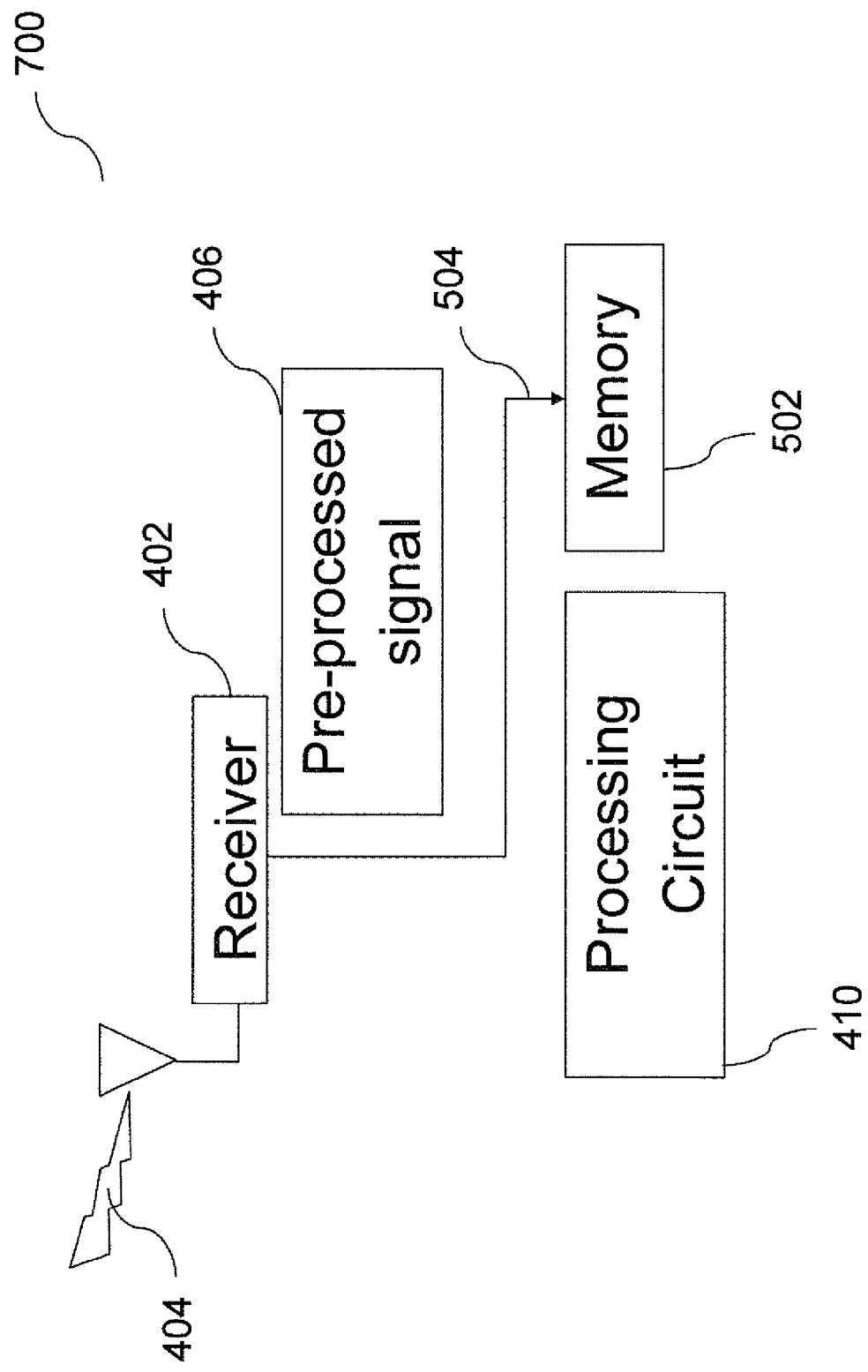
FIG. 7 shows a message flow within a circuit arrangement during a first time period.

FIG. 5 shows the memory 502 storing (in 504) the pre-processed signal 406 provided to it by the receiver 402 during the first time period. FIG. 5 also shows the processing circuit 410 simultaneously receiving (in 408) the pre-processed signal 406 from the receiver 402 during the first time period. Nonetheless, storing (in 502) the pre-processed signal 406 in memory 502 during the first time period, and receiving (in 408) the pre-processed signal 406 at the processing circuit 410 during the first time period may occur separately. FIGS. 6 and 7 illustrate this point.

FIG. 6 shows a message flow within a circuit arrangement 600 during a first time period.

The circuit arrangement 600 may include a receiver 402, a processing circuit 410, and a memory 504.

The message flow may occur between the receiver 402 and the processing circuit 410 (in 408).

In FIG. 6, the pre-processed signal 406 may be provided by the receiver 402 (in 408) to the processing circuit 410 alone during the first time period. Accordingly, the receiver 402 may not provide the pre-processed signal 406 to the memory 502 during the first time period, even though the receiver 402 may be configured to do so, and even though the memory 502 may be configured to store the pre-processed signal 406 at the first data rate during the first time period.

FIG. 7 shows a message flow within a circuit arrangement 700 during a first time period.

The circuit arrangement 700 may include a receiver 402, a processing circuit 410, and a memory 502.

The message flow may occur between the receiver 402 and the memory 502 (in 504).

In FIG. 7, the pre-processed signal 406 may be provided by the receiver 402 (in 504) to the memory 502 alone during the first time period. Accordingly, the receiver 402 may not provide the pre-processed signal 406 to the processing circuit 410 during the first time period, even though the receiver 402 may be configured to do so, and even though the processing circuit 410 may be configured to receive the pre-processed signal 406 at the first data rate during the first time period.

Figure 8:
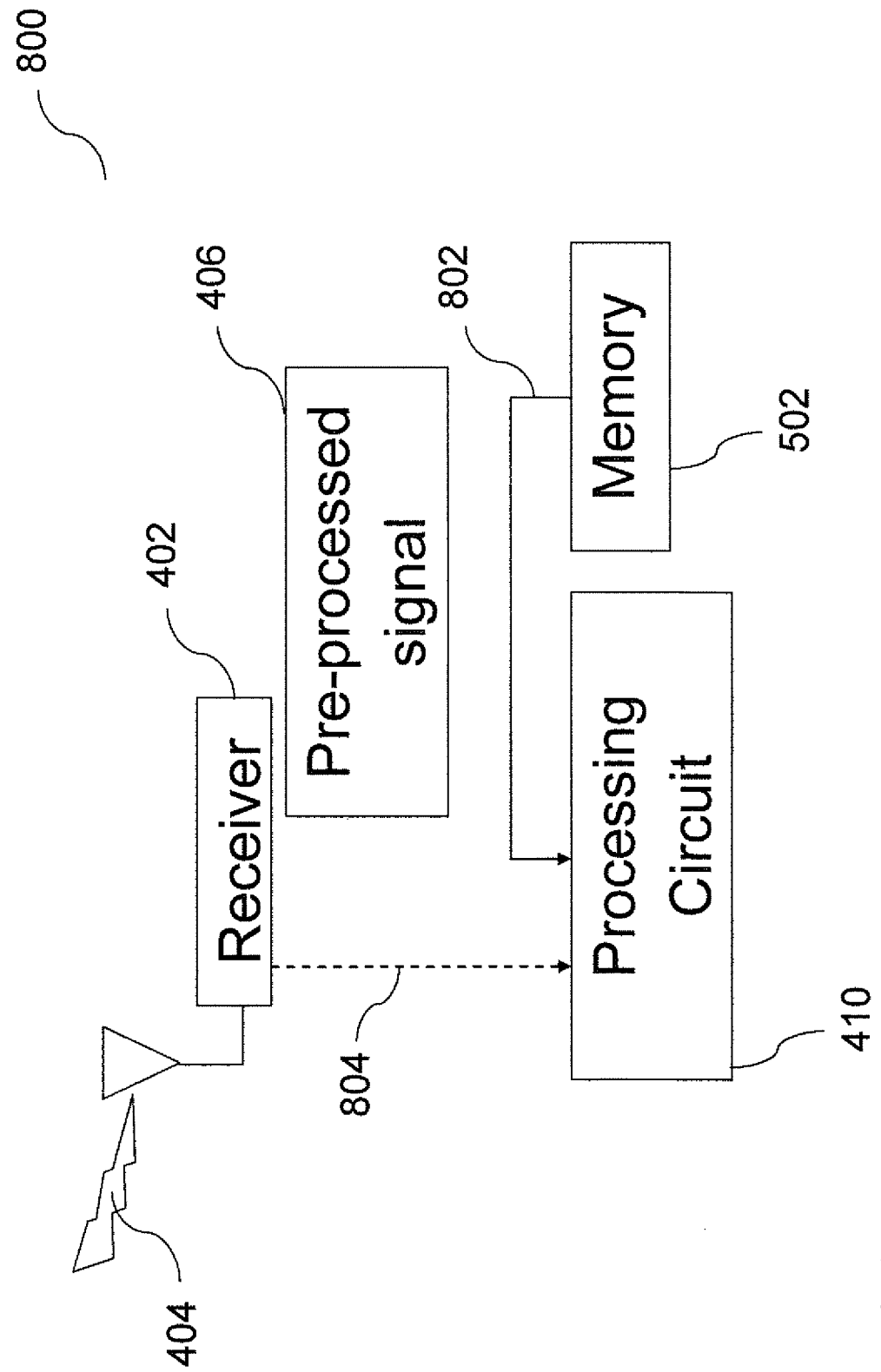
FIG. 8 shows a message flow within a circuit arrangement during a second time period.

FIG. 8 shows a message flow within a circuit arrangement 800 during a second time period.

The circuit arrangement 800 may include a memory 502 and a processing circuit 410.

The message flow (in 802) may occur between the memory 502 and the processing circuit 410.

The message flow (in 804) may occur between the receiver 402 and the processing circuit 410.

As disclosed above, the memory 502 may be configured to store the pre-processed signal 406 during the first time period, such as, for example, in FIGS. 5 and 7. Additionally, the memory 502 may be further configured to provide (in 802) the pre-processed signal 406 stored in it during the first time period to the processing circuit 410 at a second data rate during the second time period. Accordingly, the processing circuit 410 may be further configured to receive the pre-processed signal 406 at the second data rate during the second time period.

Various aspects relating to each of the second data rate and the second time period are described below.

The second time period may commence after the above-described first time period. To reiterate, the first time period may be a duration of time required to receive a sufficient number of chips or bits or bytes needed to perform or begin to perform network search and/or identification, or for signal power measurement. Since the first time period may vary according to the cellular system such as, for example, LTE cellular communications system, WLAN, WiFi, UMTS, GSM, Bluetooth, CDMA cellular communications system, etc., the second time period may commence at various absolute times, depending on the cellular system. By way of an example, the first time period in a UMTS system may be in the range of at least one UMTS slot, for example, about 14 UMTS slots to about 16 UMTS slots, such as, for example, 13.50 UMTS slots or 15.57 UMTS slots when the mobile terminal 102 is in an idle mode. Accordingly, the second time period in a UMTS system may commence after at least one UMTS slow, for example, after about 14 UMTS slots to about 16 UMTS slots when the mobile terminal 102 is in an idle mode. Similarly, the first time period in a GSM system may be in the range of at least one GSM slot, for example, about 16 GSM slots to about 19 GSM slots, such as, for example, 18.00 GSM slots when the mobile terminal is in an idle mode. Accordingly, the second time period in a GSM system may commence after about at least one GSM slow, for example, after 16 GSM slots to about 19 GSM slots when the mobile terminal 102 is in an idle mode. By way of another example, the first time period in a UMTS system may be in the range of at least one UMTS slot, for example, about 6 UMTS slots to about 8 UMTS slots, such as, for example, 7.50 UMTS slots or 7.00 UMTS slots when the mobile terminal 102 is in a connected mode. Accordingly, the second time period in a UMTS may commence after at least one UMTS slot, such as, for example, after about 6 UMTS slots to about 8 UMTS slots when the mobile terminal 102 is in a connected mode. The aforementioned commencement of the second time period is illustrative and is not meant to be limiting. In essence, the second time period commences after the first time period.

Further, since the second time period commences after the first time period, namely, after a sufficient number of chips or bits or bytes needed to perform network search and/or identification, or for signal power measurement are received, the receiver 402 may not need to continue receiving the communications signal 404 during the second time period. Accordingly, the receiver 402 may be configured to be inactive during the second time period, namely, there may not be data exchange between the receiver 402 and a base station, even though the mobile terminal in which the receiver 402 is included may still be attached to a communications network.

Consequently, the receiver 402 may not need to be switched on (namely, powered up or turned on) during the second time period since sufficient data have been received, and no further data exchange at the receiver 402 may be needed. Accordingly, the receiver 402 may be further configured to be without electrical power during the second time period.

Alternatively, the receiver 402 may be configured to receive a communications signal 404 via a communications channel during the first time period, and further configured to not receive the communications signal 404 via the communications channel during the second time period.

An effect of the receiver 402 being inactive, or not receiving the communications signal 404 via a communications channel, during the second time period may be reduced power consumption in the circuit arrangement since the time electrical components are in operation may be minimized. The receiver 402 may include the RF front-end of a mobile terminal 102. According, an effect of the receiver 402 being without electrical power during the second time period, or not receiving the communications signal 404 via a communications channel during the second time period, may be reduced power consumption in the mobile terminal, and thus, increased battery life of the mobile terminal.

Alternatively, the receiver 402 may be configured to be active during the first and second time periods. The receiver 402 may be configured to provide (in 804) the pre-processed signal 406 to the processing circuit 410 at the second data rate during the second time period.

The second data rate may refer to the rate at which the pre-processed signal 406 is provided by the memory 502 to the processing circuit 410 during the above-described second time period. By way of an example, the second data rate may be greater than the first data rate. Accordingly, the memory 502 (or a data interface of the memory 502) may be configured to support a plurality of data rates, namely, rates at which data (such as, for example, chips, bits or bytes) are written into or retrieved from the memory 502. By way of an example, the second data rate in a UMTS cellular system may be any data rate greater than the first data rate of 3.84 MChips/s. By way of other examples, the second data rate in a GSM CSD system may be any data rate greater than 14.4 kbps; the second data rate in a GPRS system may be any data rate greater than 114.0 kbps; the second data rate in an EDGE system may be any data rate greater than 300 kbps. Accordingly, the second data rate may vary according to the cellular system such as, for example, LTE cellular communications system, WLAN, WiFi, UMTS, GSM, Bluetooth, CDMA cellular communications system, etc., but may be greater than the first data rate for a particular cellular system. The aforementioned second data rates are illustrative and are not meant to be limiting. In essence, the second data rate may be greater than the first data rate.

During the second time period, the memory 502 may be configured to provide (in 802) the pre-processed signal 408 to the processing circuit 410 at the second data rate during the second time period. Accordingly, the processing circuit 410 (or a data interface of the processing circuit 410) may be configured to support a plurality of data rates, namely, rates at which data (such as, for example, chips, bits or bytes) are received by the processing circuit 410. In like manner, a data interface of the memory 502 may be configured to support a plurality of data rates since the pre-processed signal 406 may be stored in the memory 502 at a first data rate during the first time period, and the stored pre-processed signal 406 may be provided to the processing circuit 410 at a second data rate during the second time period.

The processing circuit 410 may be configured to perform communications network search by processing the pre-processed signal 406 at a second processing clock frequency during the second time period. By way of an example, the second processing clock frequency may be greater than the first processing clock frequency.

To reiterate, the first processing clock frequency may refer to the rate at which each sample of the pre-processed signal 406 is processed by the processing circuit 410 during the first time period. The first processing clock frequency may be determined by the logical clock signal provided to the processing circuit 410 during the first time period.

Similarly, the second processing clock frequency may refer to the rate at which each sample of the pre-processed signal 406 is processed by the processing circuit 410 during the second time period. The second processing clock frequency may be determined by the logical clock signal provided to the processing circuit 410 during the second time period.

By way of an example, the processing circuit 410 may be running with a processor of clock frequency 61 MHz during the first time period, but with a clock frequency greater than 61 MHz during the second time period, such as, for example, about 70 MHz, or about 150 MHz, or about 300 MHz, or about 250 MHz, or about 400 MHz, and so on. By way of another example, the processing circuit 410 may be running with a processor of clock frequency 58 MHz during the first time period, but with a clock frequency greater than 58 MHz during the second time period, such as, for example, about 80 MHz, or about 90 MHz, or about 93 MHz, or about 400 MHz, and so on. The aforementioned second processing clock frequencies are illustrative and are not meant to be limiting. In essence, the second processing clock frequency may be greater than the first processing clock frequency.

In addition, the first and second processing clock frequencies may be asynchronous to each other and to the logic clock provided to the receiver. Accordingly, there may not be any requirements for synchronization of clock signals in any components included in the circuit arrangement.

Further, the processing circuit 410 may be configured to perform communications signal 404 power measurement by processing the pre-processed signal 406 at the second processing clock frequency during the second time period. Since the pre-processed signal 406 is being processed at the second processing clock frequency for both communications network search and communications signal power measurement in the second time period, the processing circuit 410 may be configured to perform communications signal power measurement and communications network search in parallel during the second time period. Alternatively, communications signal power measurement and communications network search may be performed in any sequence.

An effect of the second data rate being greater than the first data rate, and/or the second processing clock frequency being greater than the first processing clock frequency may be that communications network search, along with signal power measurement, may be performed at a quicker speed and/or over a shorter total time duration. The quicker speed of communications network search and signal power measurement may follow from the increased rate at which pre-processed signal 406 is provided by the memory 502 to the processing circuit 410 (during the second time period), and the increased rate at which the pre-processed signal 406 is processed by the processing circuit 410 (during the second time period). Accordingly, an effect of the second data rate being greater than the first data rate and/or the second processing clock frequency being greater than the first processing clock frequency may be that a faster cell detection and power measurement rate, increased network search and/or power measurement capacity, and a reduction in the rate or number of call drops. Further, even though a faster second data rate and a higher second processing clock frequency may lead to higher instantaneous power consumption, total power consumption over the total duration of communications network search and signal power measurement may be lower, since the total time duration itself may be shorter.

A circuit arrangement (such as, for example, the circuit arrangement according to any one of FIGS. 4 to 8) may be included in a mobile terminal 102. As described earlier, the mobile terminal 102 may be in a Connected mode or in an Idle mode during the time it is within the area of coverage of a communications network. Accordingly, the mobile terminal 102, which may include the receiver 402 and the processing circuit 410 (and possibly, the memory 502), may not have at least one dedicated communications channel allocated to it during the first and second time periods. Stated differently, the mobile terminal 102 may be in an Idle mode during the first and second time periods. Similarly, the mobile terminal 102, which may include the receiver 402 and the processing circuit 410 (and possibly, the memory 502), may have at least one dedicated communications channel allocated to it during the first and second time periods. Stated differently, the mobile terminal 102 may be in a Connected mode during the first and second time periods.

Figure 9:
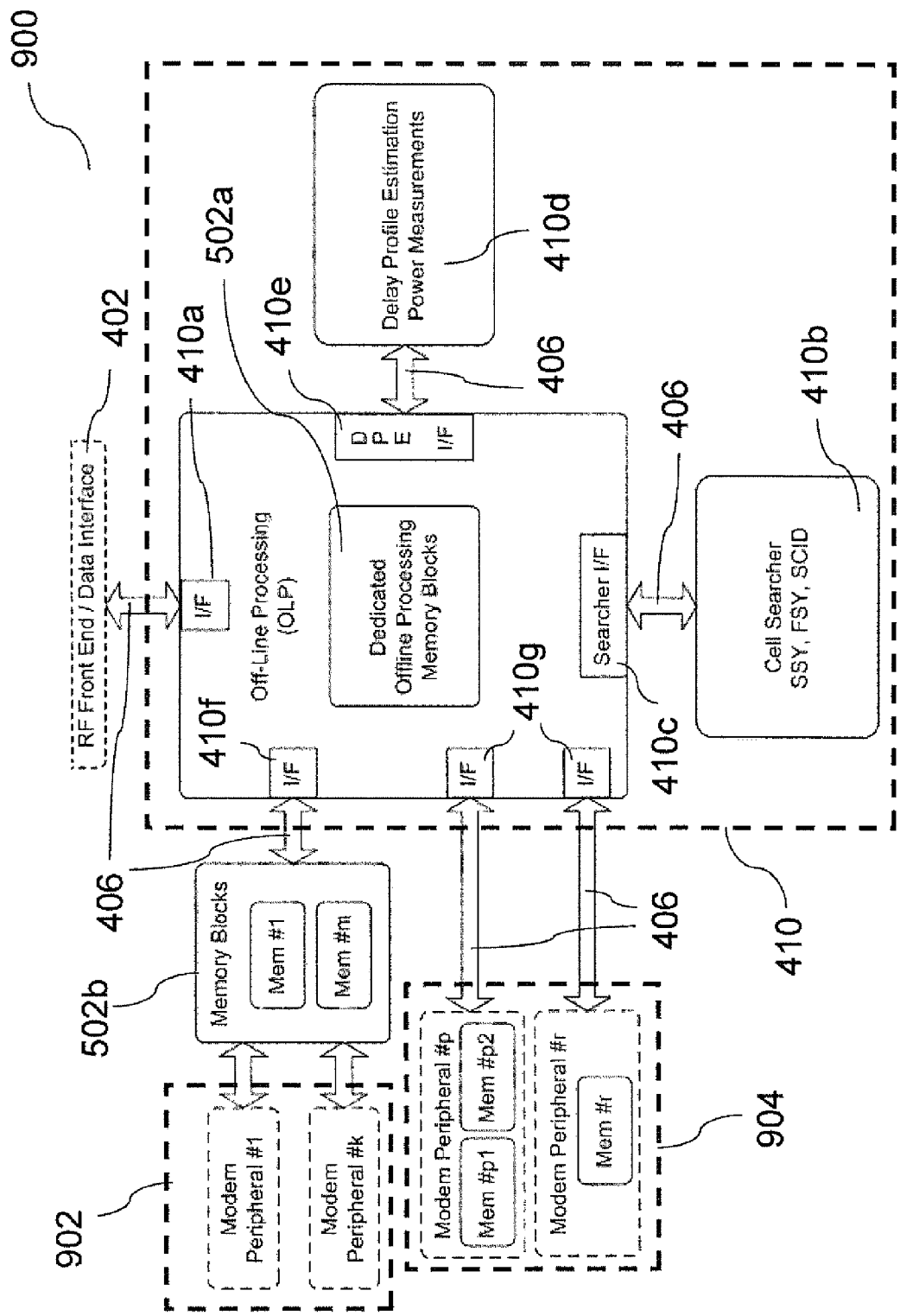
FIG. 9 shows a circuit arrangement.

FIG. 9 shows a circuit arrangement 900.

The circuit arrangement 900 may include receiver 402, which may be the RF front-end of a mobile terminal. The receiver 402 may provide a pre-processed signal 406 to the processing circuit 410. The pre-processed signal 406 may be provided by the receiver 402 to the processing circuit 410 through a data interface 410a of the processing circuit 410 that may be configured to support a plurality of data rates. The pre-processed signal 406 may include the in-phase and quadrature phase signals of a communications signal that has been at least filtered, or demodulated, or decoded, or quantized. The pre-processed signal 406 may include a measure of the reliability of the communications signal, such as, for example, the RSSI.

The processing circuit 410 may include a network searching circuit 410b configured to perform communication network search and/or identification. The network searching circuit 410b included in the processing circuit 410 may be configured to receive the pre-processed signal 406 through a network searching interface 410c that may be configured to support a plurality of data rates. The network searching circuit 410b may be configured to perform a communication network search by determining at least one of slot synchronization (SSY), frame synchronization (FSY), code group identification (SCID) and scrambling code identification (SCID) by processing the pre-processed signal 406.

The processing circuit 410 may include a signal power measurement circuit 410d configured to perform communications signal power measurement, such as, for example, delay profile estimation (DPE), by processing the pre-processed signal 406. The signal power measurement circuit 410d included in the processing circuit 410 may be configured to receive the pre-processed signal 406 through an interface, such as, for example DPE interface 410e that may be configured to support a plurality of data rates.

The processing circuit 410 may include a memory 502a configured to store the pre-processed signal 406. The circuit arrangement 900 may additionally include a memory 502b, external to the processing circuit 410, configured to store the pre-processed signal 406. The external memory 502b may be connected to peripheral devices 902, 904. Accordingly external memory 502b may be shared between the processing circuit 410 and at least one peripheral device 902 or 904. The external memory 502b and the at least one peripheral devices 902 and 904 may be coupled to the processing circuit 410 through an interface 410f, 410g that may be configured to support a plurality of data rates.

The processing circuit 410 of circuit arrangement 900 may be configured to receive the pre-processed signal 406 at a first data rate during a first time period. The processing circuit 410 may be further configured to perform at least one of a communications network search and signal power measurement by processing the pre-processed signal 406 at a first processing clock frequency during the first time period, and to perform the communications network search by processing the pre-processed signal at a second processing clock frequency during a second time period, wherein the second time period commences after the first time period, and wherein the second processing clock frequency is greater than the first processing clock frequency.

As mentioned previously, the receiver may be configured to be inactive during the second time period, namely, there may not be data exchange between the receiver 402 and a base station, even though the mobile terminal in which the receiver 402 is included may still be attached to a communications network. Accordingly, the processing circuit 410 may be configured to perform offline processing during the second time period, namely, processing a pre-processed signal 406 which has been retrieved from memory 502a 502b, and not provided by the receiver 402.

Whilst FIG. 9 has been described with regards to network searching circuit 410b and signal power measurement circuit 410d, this description is meant to be illustrative and not limiting. In essence, a pre-processed signal 406 may be provided to a plurality of circuits during a first time period (at a first data rate, and processed at a first clock frequency) and during a second time period (at a second data rate, and processed at a second clock frequency, wherein the second data rate is greater than the first data rate, and wherein the second processing clock frequency is greater than the first processing clock frequency). The plurality of circuits provided with the pre-processed signal 406 may be configured to perform different functions (such as network search, signal power measurement, or other functions that may be possible), or the plurality of circuits may be configured to perform the same function, e.g. a plurality of network search circuits provided with the pre-processed signal 406 in parallel.

A method for communication network search and signal power measurement may be provided.

Figure 10:
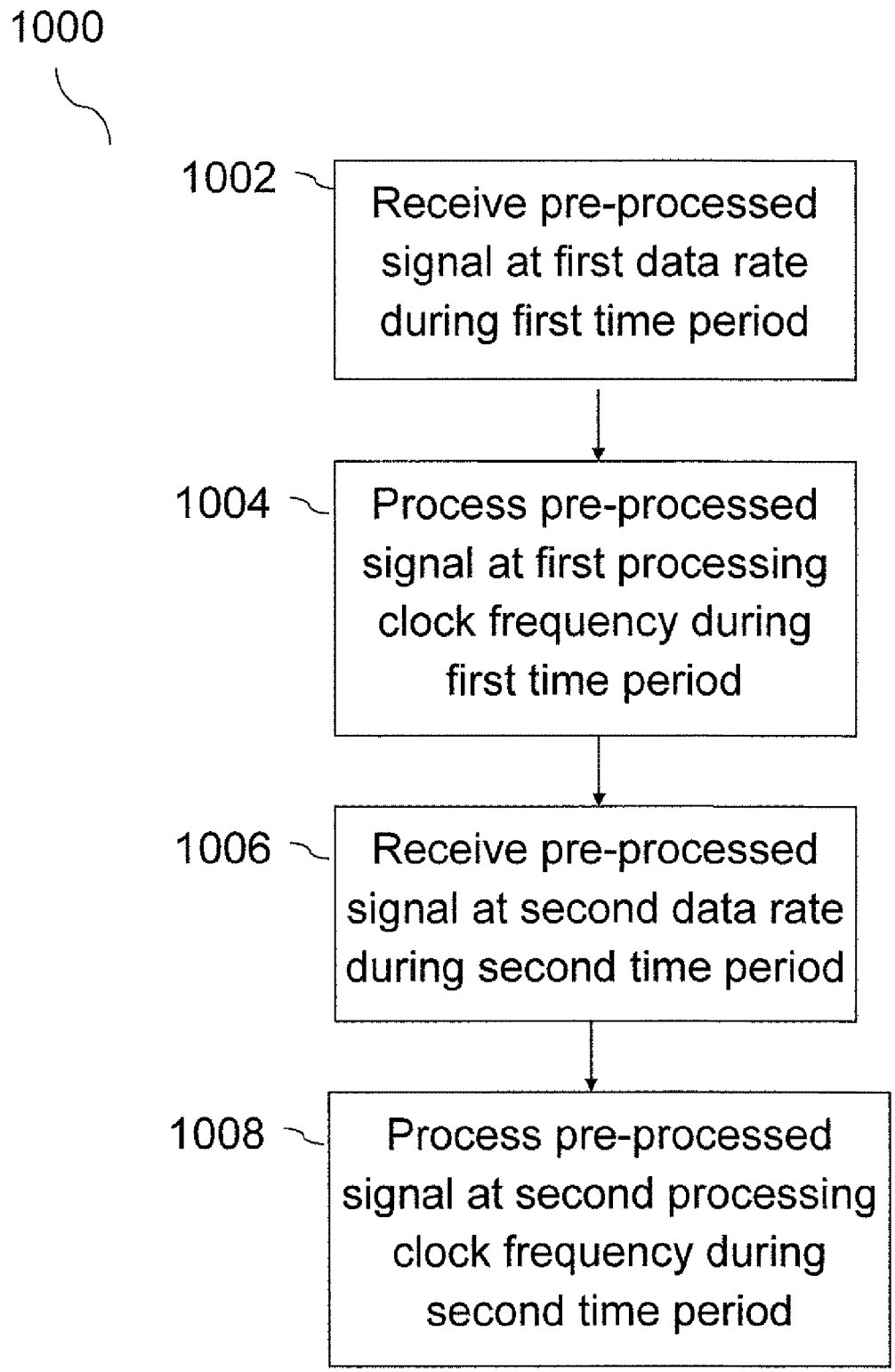
FIG. 10 shows a method for communication network search and signal power measurement.

FIG. 10 shows a method 1000 for communication network search and signal power measurement.

The method 1000 may include receiving a pre-processed signal at a first data rate during a first time period (in 1002).

By way of an example, the processing circuit 410 of each of FIGS. 4 to 6 may receive (in 408) a pre-processed signal at a first data rate during a first time period, such as in 1002 of method 1000. Also, the memory 502 of each of FIGS. 5 and 7 may receive (in 504) a pre-processed signal at a first data rate during a first time period, such as in 1002 of method 1000.

In 1004, the pre-processed signal may be processed at a first processing clock frequency during the first time period. In 1004, communications network search may be performed by processing the pre-processed signal. In 1004, communications signal power measurement may also be performed by processing the pre-processed signal.

The further features described above with reference to the pre-processed signal, the first data rate, the first processing clock frequency, and the first time period in the circuit arrangement (such as, for example, in each of FIGS. 4 to 6) are equally applicable, and hereby restated, in respect of receiving the pre-processed signal (in 1002) and processing the pre-processed signal (in 1004) of method 1000.

In 1006 of method 1000, the pre-processed signal may be received at a second data rate during a second time period. By way of an example, the processing circuit 410 of FIG. 8 may receive (in 802) a pre-processed signal 406 at the second data rate from the memory 802. Additionally, the processing circuit 410 of FIG. 8 may receive (in 804) a pre-processed signal 406 at the second data rate from the receiver 402.

In 1008 of method 100, the pre-processed signal may be processed at a second processing clock frequency during a second time period. In 1008, communications network search may be performed by processing the pre-processed signal. In 1008, communications signal power measurement may also be performed by processing the pre-processed signal.

The further features described above with reference to the second processing clock frequency and the second time period in the circuit arrangement (such as, for example, in each of FIGS. 4 to 8) are equally applicable, and hereby restated, in respect of processing the pre-processed signal (in 1008) of method 1000.

FIG. 11 shows a method 1100 for communication network search and signal power measurement.

Method 1100 may include receiving a communications signal (in 1102). In 1104, the received communications signal (in 1102) may be processed to yield a pre-processed signal. By way of an example, the receiver 402 in any one of FIGS. 4 to 7 may receive a communications signal 404 during a first time period. Additionally, the receiver 402 in any one of FIGS. 4 to 7 may process the communications signal 404 during the first time period to yield a pre-processed signal 406. By way of another example, the receiver 402 in FIG. 8 may receive a communications signal 404 during a second time period. Additionally, the receiver 402 in FIG. 8 may process the communications signal 404 during the second time period to yield a pre-processed signal 406.

The further features described above with reference to the communications signal and processing the communications signal in the circuit arrangement are equally applicable, and hereby restated, in respect of receiving the communications signal (in 1102) and processing the communications signal (in 1104) of method 1100.

The method 1100 may additionally include providing the pre-processed signal at a first data rate during the first time period (in 1106). By way of an example, the pre-processed signal 406 of any one of FIGS. 4 to 7 may be provided at a first data rate during the first time period to at least one of the memory 502 and the processing circuit 410.

The further features described above with reference to providing the pre-processed signal at a first data rate during the first time period in the circuit arrangement are equally applicable, and hereby restated, in respect of providing the pre-processed signal (in 1106) of method 1100.

The method 1100 may further include processing the pre-processed signal at a first processing clock frequency during the first time period (in 1004). In 1108 of method 1100, the pre-processed signal may be provided at a second data rate during the second time period. By way of an example, the pre-processed signal 406 of FIG. 8 may be provided at a second data rate during the second time period to the processing circuit 410 by the memory 502. Additionally, the pre-processed signal 406 of FIG. 8 may be provided at a second data rate during the second time period to the processing circuit 410 by the receiver 402.

The method 1100 may further include processing the pre-processed signal at a second processing clock frequency during a second time period (in 1006). In 1004 and 1006, communications network search may be performed by processing the pre-processed signal. In 1004 and 1006, communications signal power measurement may also be performed by processing the pre-processed signal.

Figure 12:
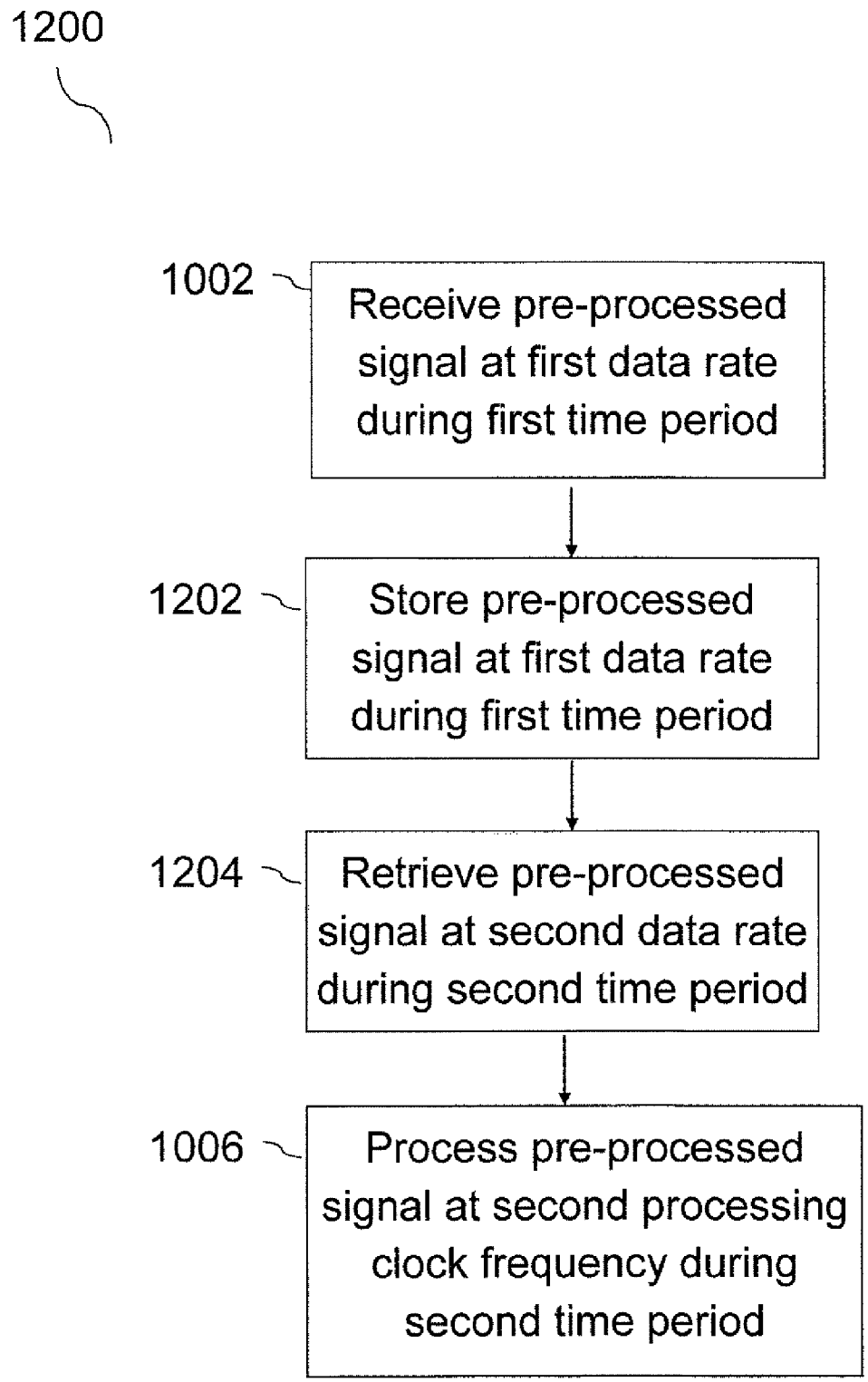
FIG. 12 shows a method for communication network search and signal power measurement.

FIG. 12 shows a method 1200 for communication network search and signal power measurement.

The method 1200 may include receiving a pre-processed signal at a first data rate during the first time period (in 1002). In 1202, the pre-processed signal may be stored at a first data rate during the first time period. By way of an example, the pre-processed signal 406 of any one of FIGS. 5 and 7 may be stored at a first data rate during the first time period in memory 502. The further features described above with reference to storing the pre-processed signal period at a first data rate during the first time period in the circuit arrangement are equally applicable, and hereby restated, in respect of storing the pre-processed signal (in 1202) of method 1200.

In 1204, the stored pre-processed signal may be retrieved at a second data rate during a second time period. By way of an example, the pre-processed signal 406 of FIG. 8 may be retrieved (in 802) from the memory 502 at a second data rate during a second time period. By way of an example, retrieving the pre-processed signal at the second data rate during the second time period (in 1204) may include receiving the pre-processed signal from the receiver at the second data rate during the second time period (e.g. in 804 of FIG. 8). The further features described above with reference to retrieving the pre-processed signal period at a second data rate during a second time period in the circuit arrangement are equally applicable, and hereby restated, in respect of retrieving the pre-processed signal (in 1204) of method 1200.

In 1006 of method 1200, the pre-processed signal may be processed at a second processing clock frequency during a second time period.

Figure 13:
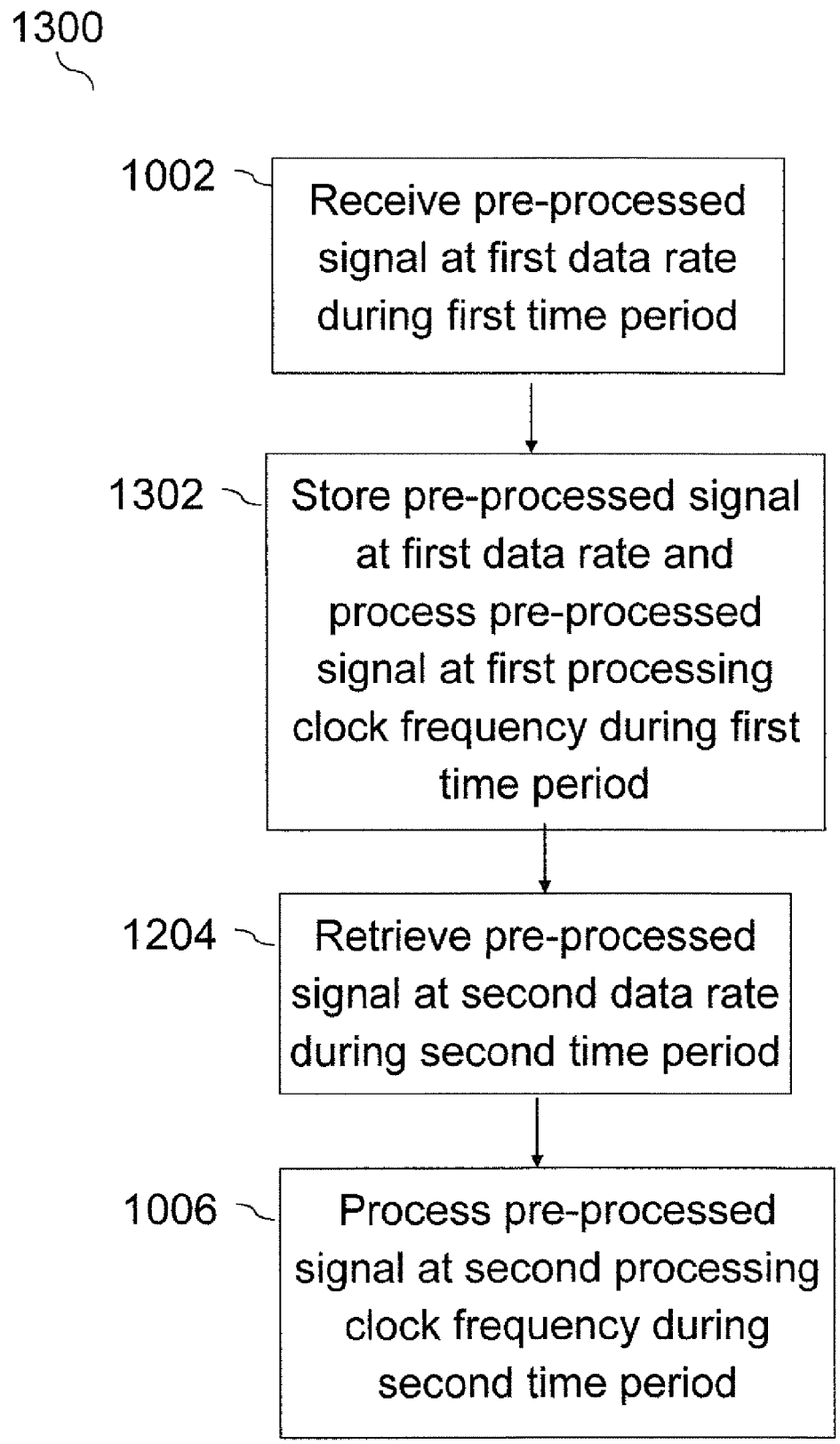
FIG. 13 shows a method for communication network search and signal power measurement.

FIG. 13 shows a method 1300 for communication network search and signal power measurement.

The method 1300 may include receiving a pre-processed signal at a first data rate during the first time period (in 1002). In 1302, the pre-processed signal may be stored at the first data rate, and processed at a first processing clock frequency during the first time period. By way of an example, the pre-processed signal 408 in FIG. 5 may be stored at the first data rate (in 504), and processed by the processing circuit 410 at a first processing clock frequency during the first time period.

In 1204 of method 1300, the stored pre-processed signal may be retrieved at a second data rate during a second time period. In 1006, processing the pre-processed signal at a second processing clock frequency during a second time period (in 1006). In 1006 of method 1200, the pre-processed signal may be processed at a second processing clock frequency during a second time period. By way of an example, retrieving the pre-processed signal at the second data rate during the second time period (in 1204) may include receiving the pre-processed signal from the receiver at the second data rate during the second time period (e.g. in 804 of FIG. 8).

Figure 14:
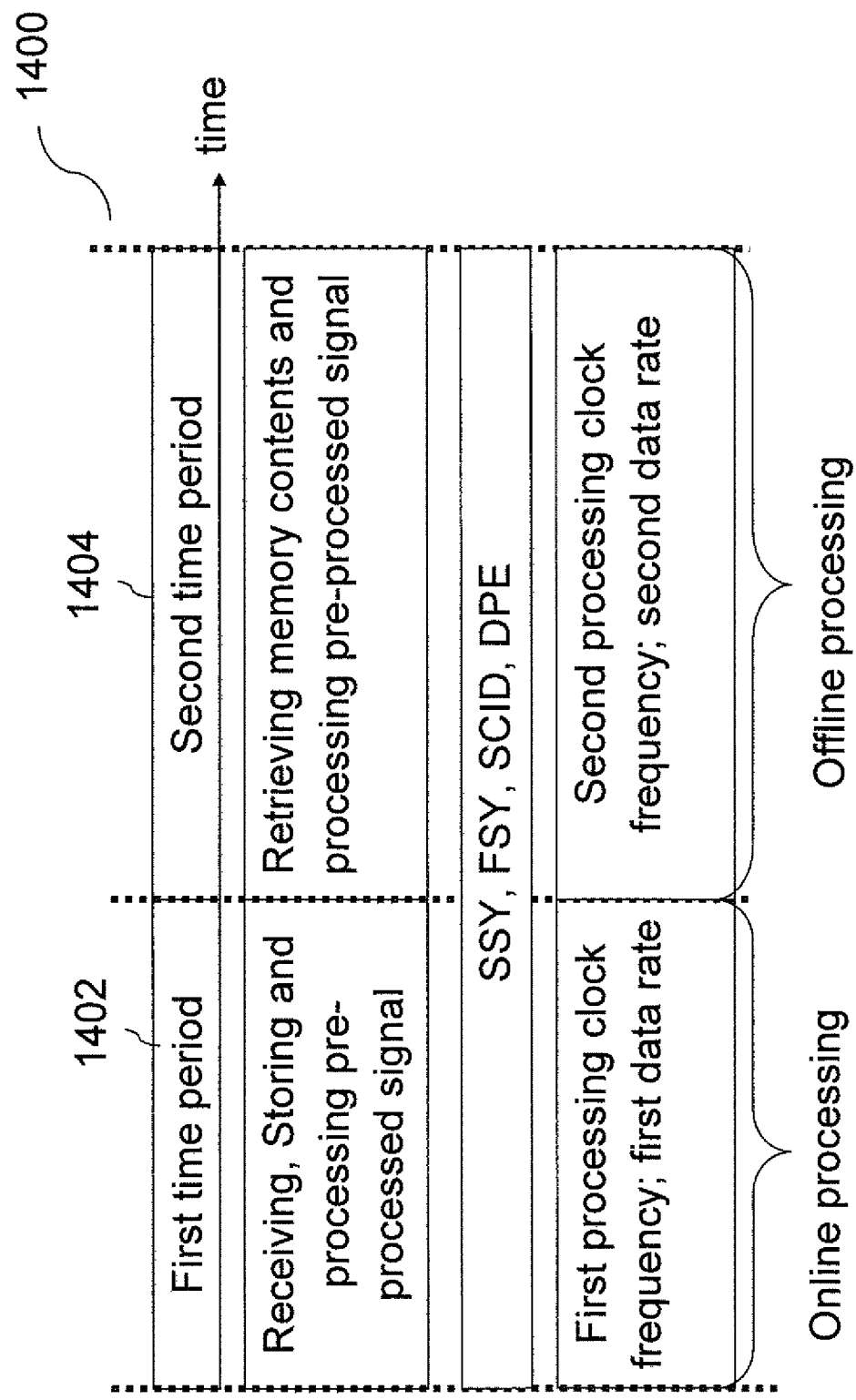
FIG. 14 shows a timing diagram for a method for communication network search and signal power measurement.

FIG. 14 shows a timing diagram 1400 for the method 1300 for communication network search and signal power measurement.

Timing diagram 1400 includes a first time period 1402 and a second time period 1404. The relative durations of the first time period 1402 and the second time period 1404 are not drawn to scale, and are meant for illustration.

During the first time period 1402, the method 1300 may include receiving the pre-processed signal (e.g. in 408 of FIGS. 4 to 7), storing the pre-processed signal at a first data rate (e.g. in 504 in FIGS. 4 to 7) and processing the pre-processed signal at a first processing clock frequency. The pre-processed signal may be processed for communication network search. The processing may include determining at least one of slot synchronization (SSY), frame synchronization (FSY), code group identification and scrambling code identification (SCID). In addition, the pre-processed signal may be processed for signal power measurement (DPE) in the first time period. Each of SSY, FSY, SCID, and DPE may be performed in parallel or in any sequence. In addition, online processing of the pre-processed signal may be performed during the first time period. As used herein, online processing may mean processing a pre-processed signal which has been provided by the receiver.

After a sufficient amount of pre-processed data has been stored in memory, the second time period 1404 may begin. During the second time period 1404, the method 1300 may include retrieving the pre-processed signal at a second data rate and processing the pre-processed signal at a second processing clock frequency. The processing may include determining at least one of slot synchronization (SSY), frame synchronization (FSY), code group identification and scrambling code identification (SCID). The pre-processed signal may be processed for signal power measurement in the second time period (DPE). Each of SSY, FSY, SCID, and DPE may be performed in parallel or in any sequence. In addition, offline processing of the pre-processed signal may be performed during the second time period. As used herein, offline processing may mean processing a pre-processed signal which has been retrieved from memory, and not provided by the receiver.

Timing diagrams similar to the construction of FIG. 14 may be constructed from each of methods 1000 to 1300, or from any combination of them. It is reiterated that the methods, and thus, the timing diagrams constructed from these methods, are applicable for a mobile terminal in an Idle mode or a Connected mode.

Figure 15:
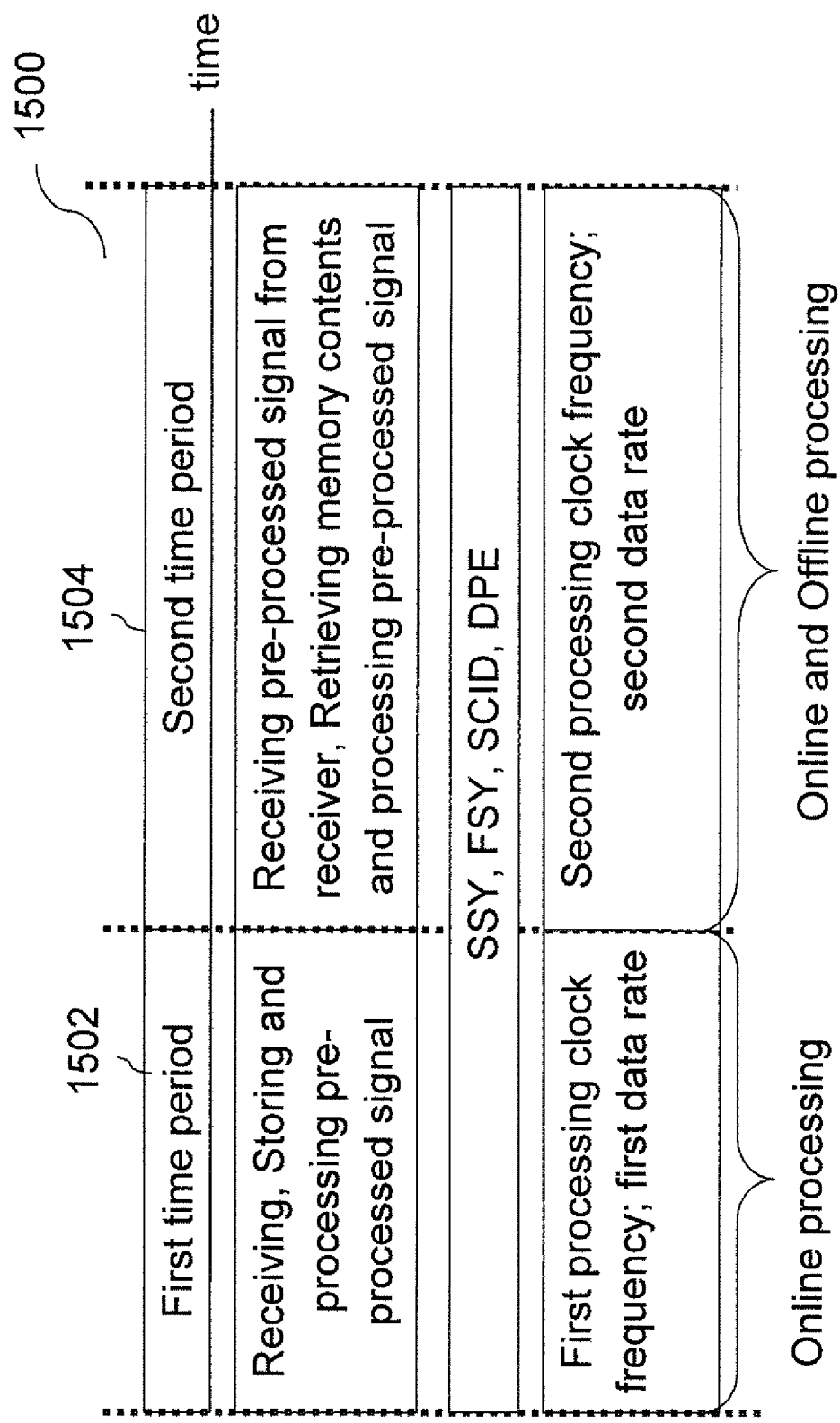
FIG. 15 shows a timing diagram for a method for communication network search and signal power measurement.

FIG. 15 shows a timing diagram 1500 for the method 1300 for communication network search and signal power measurement.

As described above, retrieving the pre-processed signal at the second data rate during the second time period (in 1204) may include receiving the pre-processed signal from the receiver at the second data rate during the second time period (e.g. in 804 of FIG. 8). Accordingly, timing diagram 1500 differs from timing diagram 1400 in that timing diagram 1500 may include a second time period 1504 in which pre-processed data may be additionally received from the receiver (such as in 804 of FIG. 8). Accordingly, in the timing diagram 1500, both online and offline processing may occur during the second time period 1504. Nonetheless, the first and second time periods may be distinguished by at least their relative processing clock frequencies and their data rates.

While various aspects of this disclosure have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A circuit arrangement, comprising:
a receiver configured to process a first received wireless signal to generate a digitally-sampled communication signal during a first time period;
a processing circuit configured to process the digitally-sampled communication signal at a first processing clock frequency during the first time period; and
a memory configured to store the digitally-sampled communication signal during the first time period,
the processing circuit being further configured to receive the digitally-sampled communication signal from the memory during a second time period and perform a communications network search by processing the digitally-sampled communication signal at a second processing clock frequency greater than the first processing clock frequency during the second time period,
the receiver being further configured to process a second received wireless signal or enter a reduced power state during the second time period, and
the circuit arrangement being configured to manage mobile communications based on the communications network search.

2. The circuit arrangement according to claim 1,
wherein the processing circuit is configured to receive the digitally-sampled communication signal at a first data rate during the first time period and
to receive the digitally-sampled communication signal from the memory at a second data rate greater than the first data rate during the second time period.

3. The circuit arrangement according to claim 1, wherein the receiver is configured to provide the digitally-sampled communication signal to the processing circuit.

4. The circuit arrangement according to claim 3, wherein the receiver is further configured to provide the digitally-sampled communication signal to the processing circuit at a first data rate during the first time period.

5. The circuit arrangement according to claim 1, wherein the receiver is further configured to be without electrical power during the second time period.

6. The circuit arrangement according to claim 2, the memory being further configured to provide the stored digitally-sampled communication signal to the processing circuit at the second data rate during the second time period.

7. The circuit arrangement according to claim 6, wherein the receiver is further configured to provide the digitally-sampled communication signal to the memory at the first data rate during the first time period.

8. The circuit arrangement according to claim 6, wherein a data interface of at least one of the memory and the processing circuit is configured to support a plurality of data rates.

9. The circuit arrangement according to claim 1, the processing circuit being further configured to perform communications signal power measurement by processing the digitally-sampled communication signal at the second processing clock frequency during the second time period.

10. The circuit arrangement according to claim 1, the processing circuit being further configured to perform communications signal power measurement by processing the digitally-sampled communication signal at the first processing clock frequency during the first time period.

11. The circuit arrangement according to claim 3, the receiver being configured to receive at least one of a synchronization channel signal and a common pilot channel signal as the received wireless communication signal.

12. The circuit arrangement according to claim 11, the receiver being configured to receive a UMTS communications signal as the received wireless communication signal.

13. The circuit arrangement according to claim 11, the receiver being configured to receive a GSM communications signal as the received wireless communication signal.

14. The circuit arrangement according to claim 1, wherein the processing circuit is configured to perform the communications network search by determining at least one of slot synchronization, frame synchronization, code group identification and scrambling code identification by processing the digitally-sampled communication signal.

15. The circuit arrangement according to claim 3, wherein the receiver and the processing circuit are arranged in a mobile terminal.

16. The circuit arrangement according to claim 15, wherein the receiver and the processing circuit are arranged in the mobile terminal, and wherein the mobile terminal does not have a dedicated communications channel allocated to it during the first and second time periods.

17. The circuit arrangement according to claim 15, wherein the receiver and the processing circuit are arranged in the mobile terminal, and wherein the mobile terminal has a dedicated communications channel allocated to it during the first and second time periods.

18. A method for communication network search and signal power measurement, the method comprising:
  processing a first received wireless communication signal at a receiver to generate a digitally-sampled communication signal;
  receiving the digitally-sampled communication signal at a processing circuit;
  processing the digitally-sampled communication signal at the processing circuit at a first processing clock frequency during a first time period,
  storing the digitally-sampled communication signal at a memory during the first time period;
  receiving the digitally-sampled communication signal at the processing circuit from the memory during the second time period;
  processing the digitally-sampled communication signal at the processing circuit at a second processing clock frequency greater than the first processing clock frequency during a second time period to perform a communications network search;
  processing a second received wireless signal at the receiver or entering a reduced power state at the receiver during the second time period; and
  managing mobile communications based on the communications network search.

19. The method according to claim 18, wherein receiving the digitally-sampled communication signal at the processing circuit comprises receiving the digitally-sampled communication signal at a first data rate during the first time period.

20. The method according to claim 19, wherein receiving the digitally-sampled communication signal at the processing circuit from the memory during the second time period comprises receiving the digitally-sampled communication signal at a second data rate during the second time period, wherein the second data rate is greater than the first data rate.

21. The method according to claim 19, wherein the storing the digitally-sampled communication signal at the memory during the first time period comprises storing the digitally-sampled communication signal at the memory at the first data rate during the first time period; and
  wherein the receiving the digitally-sampled communication signal at the processing circuit from the memory during the second time period comprises receiving the stored digitally-sampled communication signal at the second data rate during the second time period.

* * * * *